(12) United States Patent
Almy et al.

(10) Patent No.: US 8,101,849 B2
(45) Date of Patent: Jan. 24, 2012

(54) TILT ASSEMBLY FOR TRACKING SOLAR COLLECTOR ASSEMBLY

(75) Inventors: Charles Almy, Berkeley, CA (US); John Peurach, San Francisco, CA (US); Reuben Sandler, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 275 days.

(21) Appl. No.: 12/021,727

(22) Filed: Jan. 29, 2008

(65) Prior Publication Data

US 2008/0245360 A1    Oct. 9, 2008

Related U.S. Application Data

(60) Provisional application No. 60/896,775, filed on Mar. 23, 2007, provisional application No. 60/991,597, filed on Nov. 30, 2007.

(51) Int. Cl.
  *F24J 2/54* (2006.01)
  *E04B 7/02* (2006.01)
  *H02N 6/00* (2006.01)
  *H01L 25/00* (2006.01)

(52) U.S. Cl. ........ 136/246; 136/244; 124/600; 124/605; 124/608; 124/574; 124/696; 124/714; 124/569; 52/173.3; 52/302.1; 52/530

(58) Field of Classification Search ............... 136/246, 136/244; 126/600, 605, 608, 574, 696, 714, 126/569; 52/173.3, 302.1, 530
See application file for complete search history.

(56) References Cited

U.S. PATENT DOCUMENTS

| 4,000,734 | A |   | 1/1977  | Matlock et al. |         |
|-----------|---|---|---------|----------------|---------|
| 4,103,672 | A | * | 8/1978  | Meyer          | 126/604 |
| 4,108,154 | A |   | 8/1978  | Nelson         |         |
| 4,173,213 | A | * | 11/1979 | Kelly          | 126/604 |

(Continued)

FOREIGN PATENT DOCUMENTS

JP    60169173    9/1985

(Continued)

OTHER PUBLICATIONS

Shugar et al., Commercialization of a Value-Engineered Photovoltaic Tracking System, Proceedings of the 25th IEEE Photovoltaic Specialists Conference, May 1996, pp. 1537-1540, Washington, DC, USA.

(Continued)

*Primary Examiner* — Alexa Neckel
*Assistant Examiner* — Golam Mowla
(74) *Attorney, Agent, or Firm* — Knobbe, Martens, Olson & Bear, LLP

(57) ABSTRACT

A tilt assembly is used with a solar collector assembly of the type comprising a frame, supporting a solar collector, for movement about a tilt axis by pivoting a drive element between first and second orientations. The tilt assembly comprises a drive element coupler connected to the drive element and a driver, the driver comprising a drive frame, a drive arm and a drive arm driver. The drive arm is mounted to the drive frame for pivotal movement about a drive arm axis. Movement on the drive arm mimics movement of the drive element. Drive element couplers can extend in opposite directions from the outer portion of the drive arm, whereby the assembly can be used between adjacent solar collector assemblies in a row of solar collector assemblies.

15 Claims, 25 Drawing Sheets

U.S. PATENT DOCUMENTS

| | | | |
|---|---|---|---|
| 4,184,482 A * | 1/1980 | Cohen | 126/606 |
| 4,187,123 A | 2/1980 | Diggs | |
| 4,316,448 A * | 2/1982 | Dodge | 126/600 |
| 4,345,582 A | 8/1982 | Aharon et al. | |
| 4,365,617 A | 12/1982 | Bugash et al. | |
| 4,404,465 A * | 9/1983 | Miller | 250/203.4 |
| 4,429,178 A | 1/1984 | Prideaux et al. | |
| 4,585,318 A * | 4/1986 | Seifert | 353/3 |
| 4,765,309 A * | 8/1988 | Legge | 126/601 |
| 4,832,001 A | 5/1989 | Baer | |
| 4,995,377 A * | 2/1991 | Eiden | 126/605 |
| 5,228,924 A | 7/1993 | Barker et al. | |
| 5,253,637 A * | 10/1993 | Maiden | 126/696 |
| 5,542,409 A * | 8/1996 | Sampayo | 126/606 |
| 5,730,117 A * | 3/1998 | Berger | 126/604 |
| 6,058,930 A | 5/2000 | Shingleton | |
| 2004/0238025 A1 * | 12/2004 | Shingleton | 136/246 |

FOREIGN PATENT DOCUMENTS

| | | |
|---|---|---|
| JP | 03145168 | 6/1991 |
| WO | 0155651 | 8/2001 |
| WO | 2004083741 | 9/2004 |

OTHER PUBLICATIONS

Shugar et al., Design and Prototype of a Minimal Cost Tracking Photovoltaic Array Structure, Proceedings of the American Solar Energy Society Conference, Solar '95, Jul. 1995, Minneapolis, MN, USA, 6 pp.

* cited by examiner

TILT ASSEMBLY FOR TRACKING SOLAR COLLECTOR ASSEMBLY

CROSS REFERENCE TO OTHER APPLICATIONS

This application claims the benefit of U.S. Provisional Application Nos. 60/896,775, filed 23 Mar. 2007 and 60/991,597, filed 30 Nov. 2007, both entitled STACKABLE TRACKING SOLAR COLLECTOR ASSEMBLY.

FEDERALLY SPONSORED RESEARCH OR DEVELOPMENT

This invention was made with U.S. Government support under Subcontract Number ZAX-6-33628-09 awarded by the National Renewable Energy Laboratory. The U.S. Government has certain rights to this invention.

BACKGROUND OF THE INVENTION

This invention relates to solar energy collection, and in particular to an arrangement for driving a row of solar collector assemblies to track the motion of the sun relative to the earth. The invention applies to solar collectors in which the solar collector modules include arrays of photovoltaic cells for generating electrical power, but the same principles can be applied also to arrangements for solar heating, for example.

Photovoltaic arrays are used for a variety of purposes, including as a utility interactive power system, as a power supply for a remote or unmanned site, a cellular phone switch-site power supply, or a village power supply. These arrays can have a capacity from a few kilowatts to a hundred kilowatts or more, and are typically installed where there is a reasonably flat area with exposure to the sun for significant portions of the day.

In general terms, these solar collector assemblies have their solar collector modules, typically photovoltaic modules, supported on a frame. The frame commonly includes a frame member, sometimes referred to as a torque tube or torque member, which serves as an axis. A tracker drive system, also called a tilt assembly, may be used to rotate or rock the solar collector assemblies of the one or more rows of solar collector assemblies about their tilt axes to keep the photovoltaic modules as square to the sun as possible. Usually, the rows are arranged with the tilt axes of the solar collector assemblies disposed in a north-south direction, and the tilt assemblies gradually rotate the one or more rows of solar collector assemblies throughout the day from an east-facing direction in the morning to a west-facing direction in the afternoon. The solar collector assemblies are brought back to the east-facing orientation for the next day.

One solar collector arrangement of this type is shown in Barker et al. U.S. Pat. No. 5,228,924. There, each row of panels is affixed to a horizontal pivot shaft that is supported on two or more support piers on which the pivot shaft is journaled. A drive mechanism is mounted on one of the piers, and pushes against the solar panel at some point that is displaced from the shaft. In that case, the drive is of the screw type, and as a drive motor rotates, a shaft retracts or extends to rotate the row of panels in one direction or the other. In this arrangement, each row of panels has its own respective drive mechanism. Other designs, such as that shown in U.S. Pat. No. 6,058,930, employ a single actuator to control multiple rows of solar panels.

BRIEF SUMMARY OF THE INVENTION

An example of a tilt assembly is used with a solar collector assembly of the type comprising a frame, supporting a solar collector, for movement about a tilt axis by pivoting a drive element between first and second orientations. The tilt assembly comprises a drive element coupler connected to the drive element at a position along the drive element spaced apart from the tilt axis by a first distance. The tilt assembly also comprises a driver, the driver comprising a drive frame, a drive arm and a drive arm driver. The drive arm is mounted to the drive frame for pivotal movement about a drive arm axis. The drive arm is pivotal between third and fourth orientations. The drive arm has an inner portion extending from the drive frame and an outer portion drivingly connected to the drive element coupler at a drive position along the drive arm. The drive position is spaced apart from the drive arm axis by a second distance. The drive arm driver is drivingly coupled to the drive arm for movement of the drive arm between the third and fourth orientations. In some examples the first and second distances are substantially the same. In some examples the driver further comprises a drive arm support pivotally mounted to the drive frame for pivotal movement about the drive arm axis, the drive arm being mounted to the drive arm support. In some examples the drive arm axis is orientable to be substantially parallel to the tilt axis. In some examples the driver is configured such that movement of the drive arm between the third and fourth orientations substantially mimics movement of the drive element between the first and second orientations. In some examples the drive frame is constructed so that the drive element coupler can pass beneath a portion of the drive frame as the drive arm pivots between the third and fourth orientations. In some examples first and second of the drive element couplers extend in substantially opposite directions from the outer portion of the drive arm, whereby the assembly can be used between adjacent solar collector assemblies in a row of solar collector assemblies.

An example of a solar collector installation comprises first and second, side-by-side, solar collector assemblies and a tilt assembly. Each solar collector assembly comprises a frame, supporting a solar collector, for movement about a tilt axis by pivoting a drive element between first and second orientations. The tilt axes are generally parallel to one another. The tilt assembly comprises first and second drive element couplers and a driver. Each drive coupler is connected to a drive element at a position along said drive element spaced apart from the tilt axis by a first distance. The driver is positioned between the first and second solar collector assemblies. The driver comprises a drive frame, a drive arm and a drive arm driver. The drive arm is mounted to the drive frame for pivotal movement about a drive arm axis. The drive arm is pivotal between third and fourth orientations. The drive arm has an inner portion extending from the drive frame and an outer portion drivingly connected to the first and second drive element couplers at a drive position along the drive arm. The drive position is spaced apart from the drive arm axis by a second distance. The drive arm driver is drivingly coupled to the drive arm for movement of the drive arm between the third and fourth orientations.

Other features, aspects and advantages of the present invention can be seen on review of the figures, the detailed description, and the claims which follow.

DESCRIPTION OF THE SPECIFIC EMBODIMENTS

Figure 1:
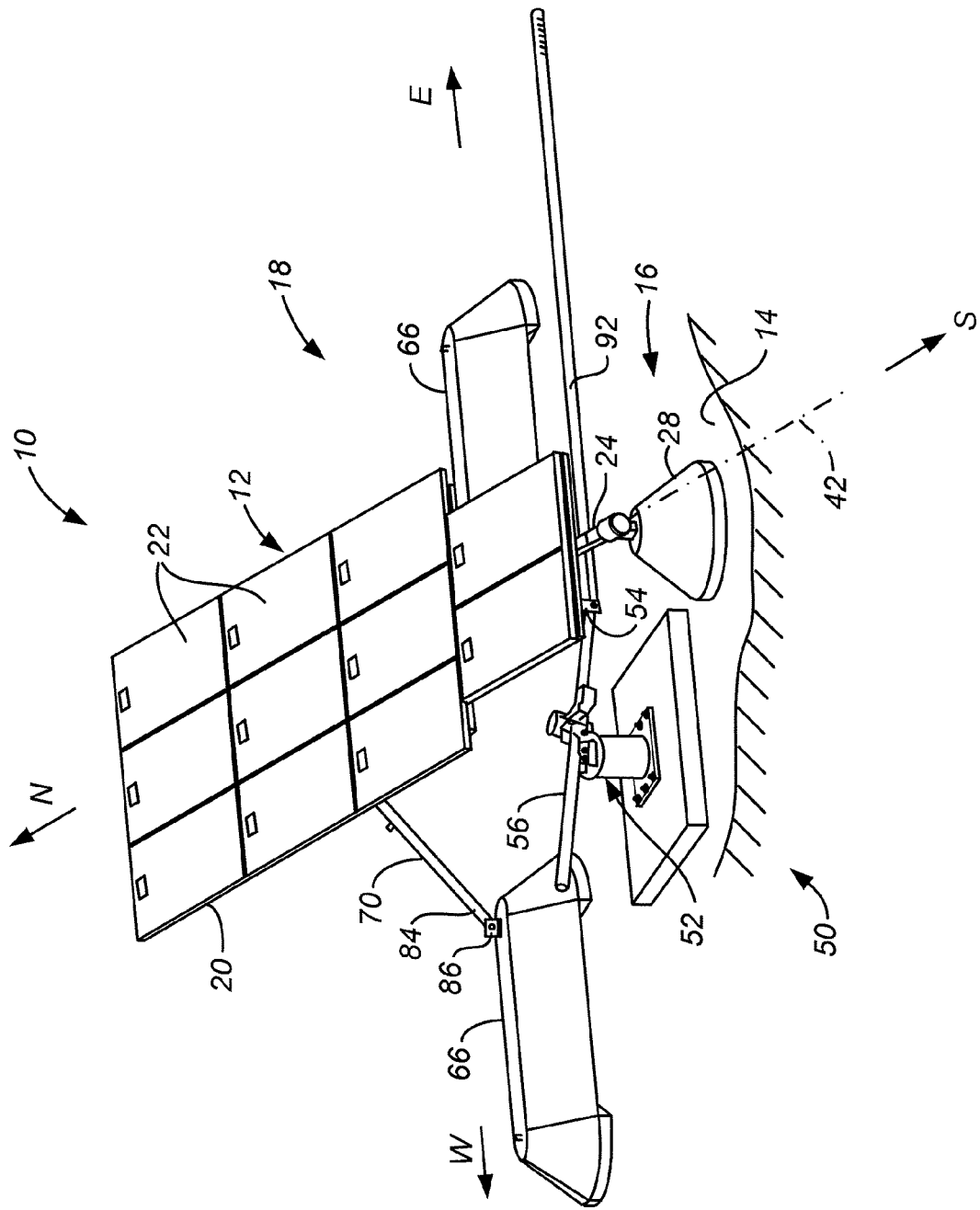
FIG. 1 is a front, left side, top view showing an example of a solar collector assembly.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

One of the advantages accruing from some examples of the invention is that the movement of the drive arm of the tilt assembly mimics the movement of the drive element of the solar collector assembly for improved drive efficiency.

Figure 4:
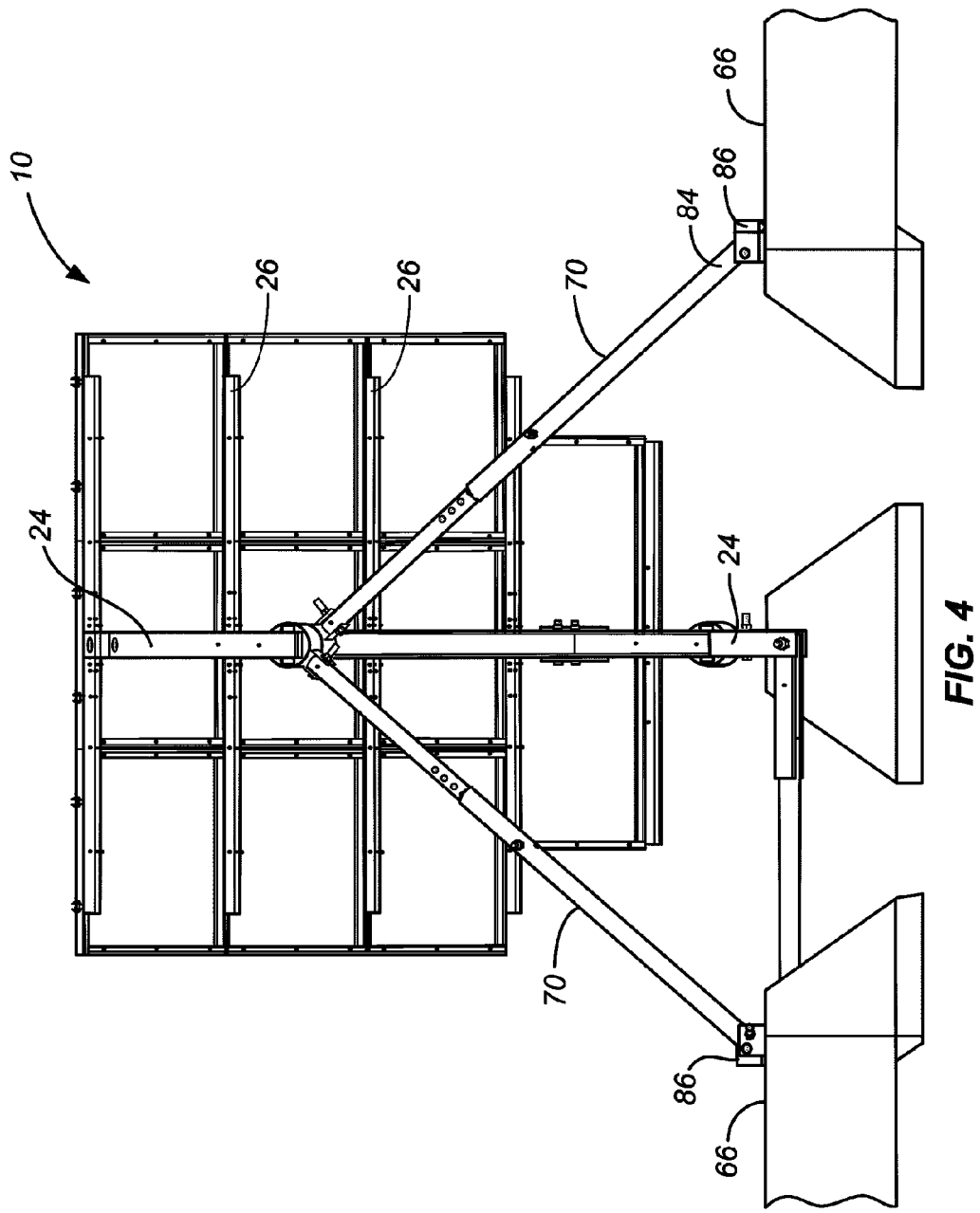
Figure 5:
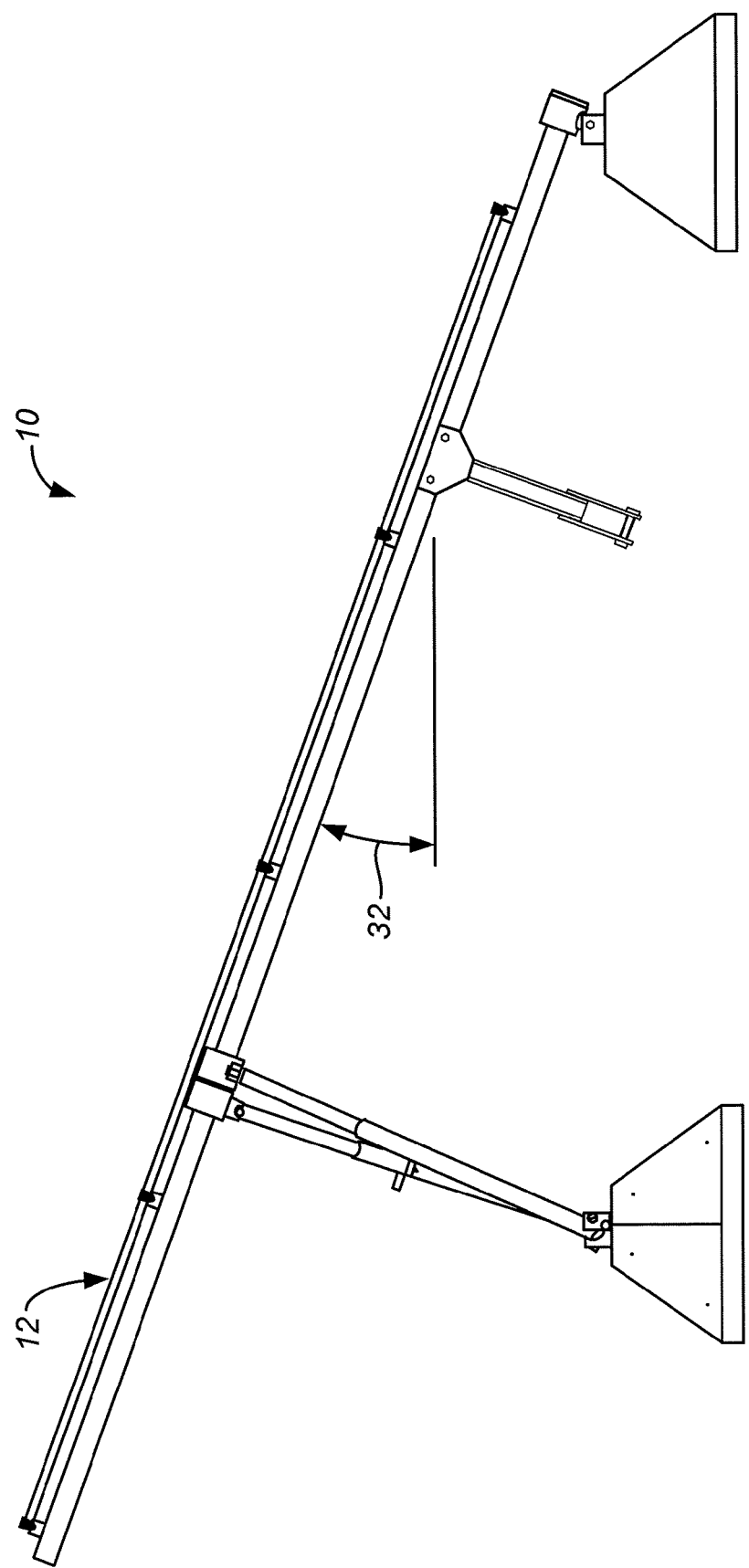

FIG. 1 illustrates a solar collector assembly 10 including broadly a solar collector module assembly 12 mounted above a support surface 14, typically the ground, by a first support 16, sometimes referred to as south side support 16, and by a second support 18, sometimes referred to as north side support 18. Solar collector module assembly 12 includes a frame 20 supporting a number of solar collector modules 22. As shown in FIGS. 4 and 5, frame 20 includes a frame member 24, sometimes referred to as torque member 24, supporting transversely oriented rails 26. Solar collector modules 22 are secured to rails 26 by clips 27 (see FIGS. 6 and 7A) or other mounting structure appropriate to the construction of the solar collector modules. An example of clips suitable for use with solar collector modules 22 having a peripheral frame is disclosed in U.S. patent application Ser. No. 11/681,972 filed 5 Mar. 2007.

Figure 5A:
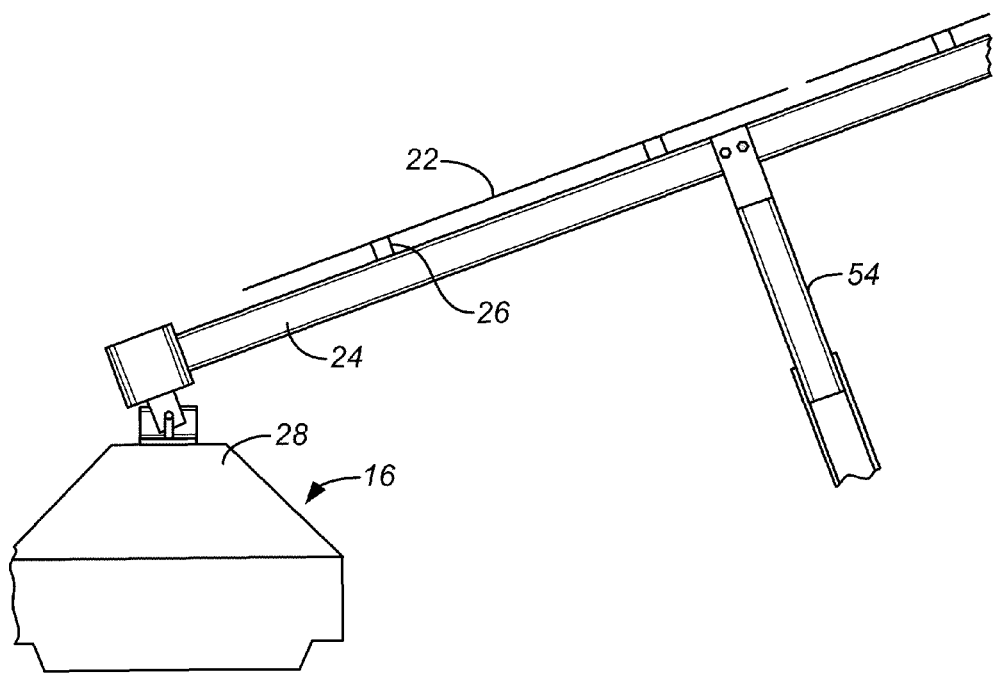
FIG. 5A is an enlarged right side elevational view of a further example of the invention in which the solar collector module is a frameless solar collector module secured to the rails of the frame by an adhesive.

FIG. 5A illustrates an alternative example in which solar collector module 22 is a frameless module secured to rails 26 of frame 20 using an adhesive. The use of a frameless solar collector module can provide several advantages, including saving the cost of solar collector module frames, increasing the stack density due to lower overall height, and helping to prevent theft because frameless modules can be adhered to the substructure which makes it difficult to remove the module without damaging it.

Figure 6:
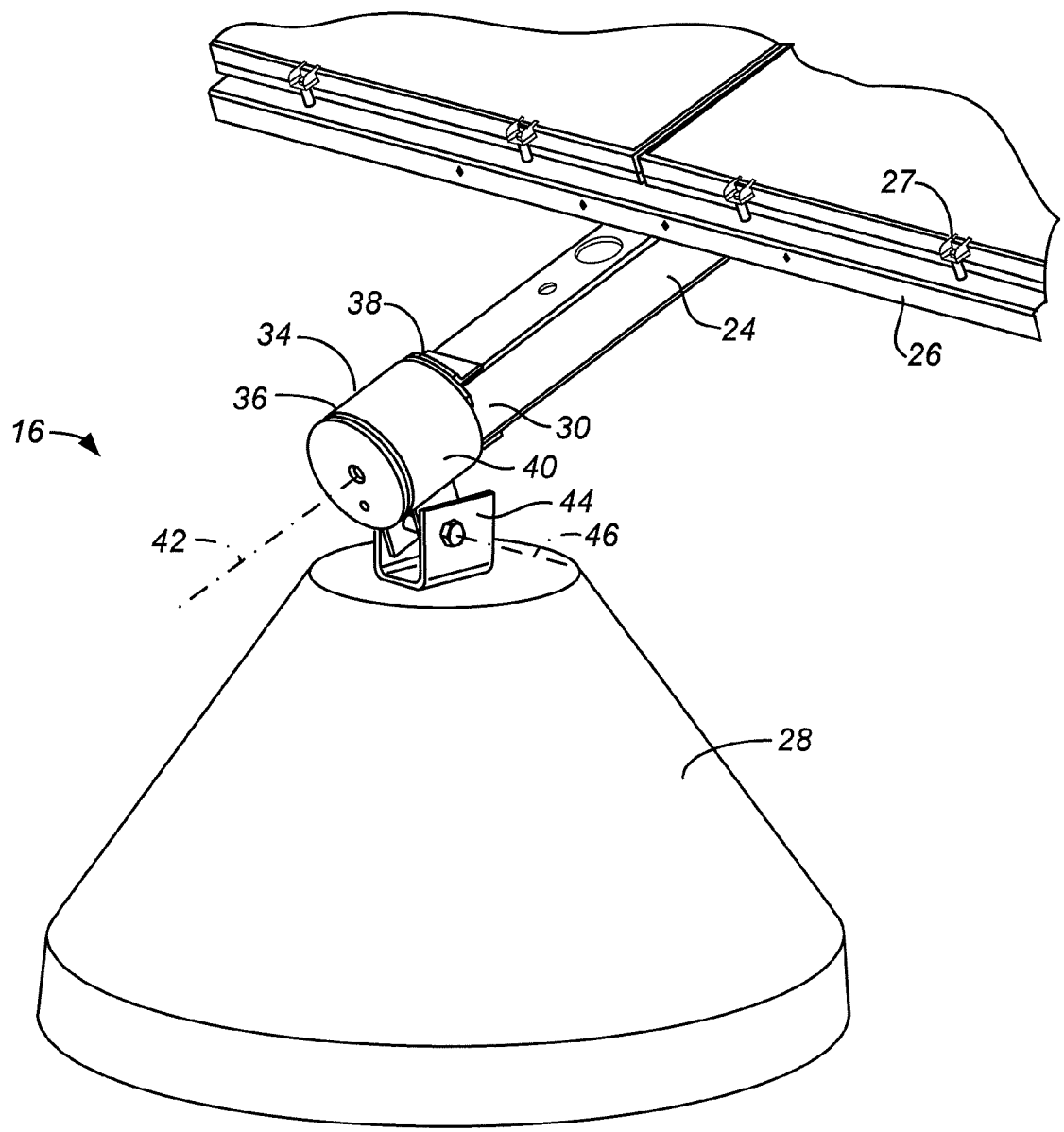
FIG. 6 is an enlarged view showing the south side support of FIG. 1.

As shown in FIG. 6, south side support 16 includes a first surface mount 28, sometimes referred to as south base 28, resting on and substantially above support surface 14. In appropriate cases some surface preparation of support surface 14 may be necessary or desirable to provide a stable surface for base 28. South base 28 is an anchorless, ballast type base designed to be sufficiently heavy to secure the south end 30 of torque member 24 in place without the need for substantial excavation of the support surface, such as would be necessary if base 28 were buried within the support surface, or the need to otherwise anchor the south base to support surface 14. South base 28 is typically made of concrete. For solar collector assemblies 10 having a surface area of about 9.3 to 37 square meters (100 to 400 sq. ft.) oriented at a tilt angle 32 (see FIG. 5) of 20°, south base 28 preferably has a weight of at least 680 kg (1500 lbs.)

Torque member 24 is pivotally secured to south base 28 by a south side joint 34. South side joint 34 includes a south bearing assembly 36 having an inner bearing member 38 affixed to south end 30 of torque member 24 and an outer bearing member 40 rotatable about inner bearing member 38. This permits torque member 24 to rotate or pivot about a tilt axis 42 defined by the torque member. South side joint 34 also includes a south pivot mount 44 securing outer bearing member 40 of south bearing assembly 36 to south base 28 for pivotal movement about a generally horizontal south pivot axis 46. This permits tilt angle 32 to be changed. The orientation of south pivot mount 44 relative to south base 28 can also be adjusted about a vertical axis. The ability to adjust the orientation of south pivot mount and the ability of torque member 24 to pivot about tilt axis 42 and about south pivot axis 46 helps to accommodate unevenness in support surface 14 thereby helping to eliminate extensive preparation of support surface 14 prior to installation.

Figure 8:
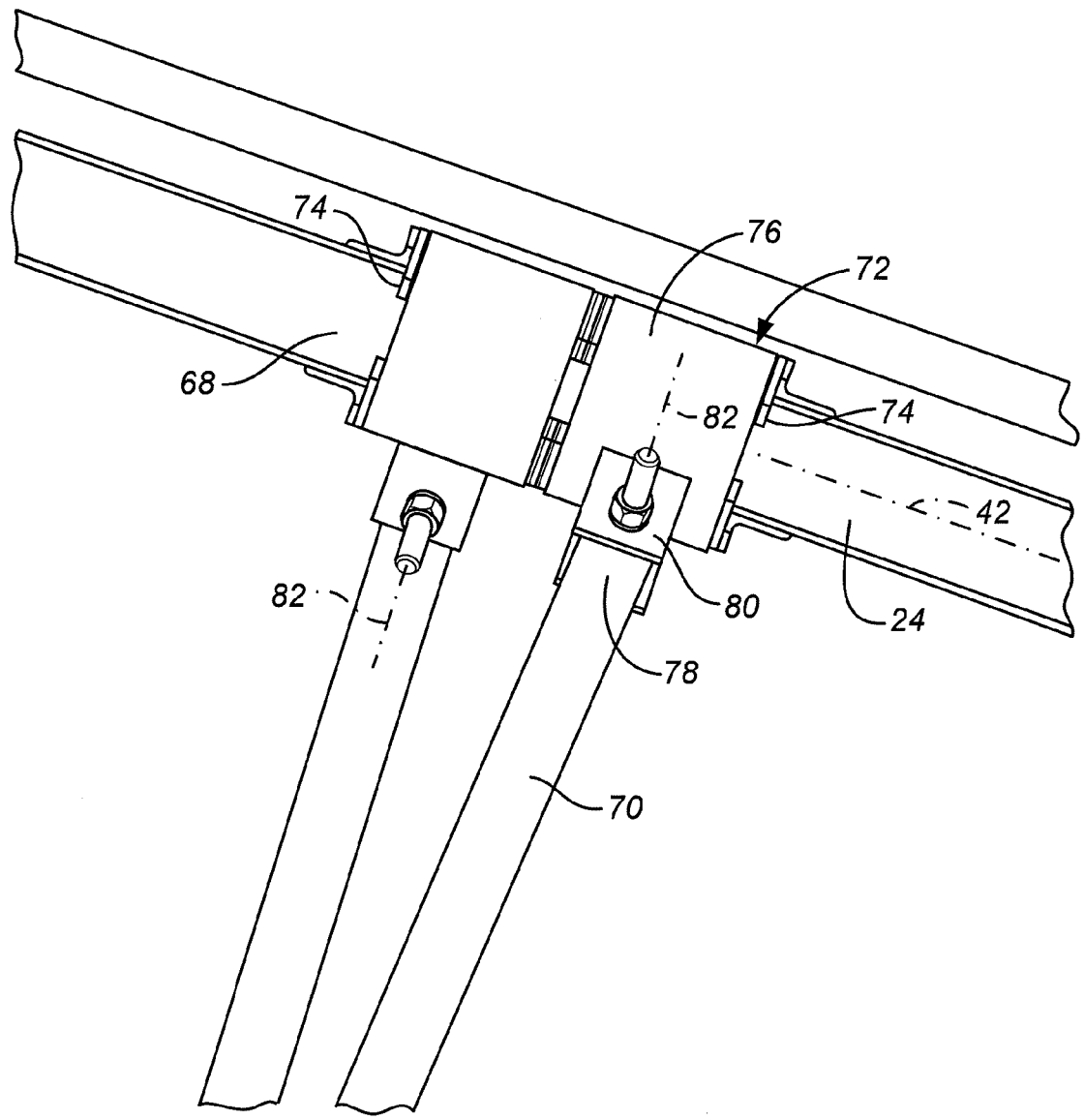
FIGS. 8 and 9 are enlarged side and end views of a portion of the underside of the assembly of FIGS. 1-5 illustrating bearing assemblies securing the upper ends of the support struts to the torque member.
Figure 9:
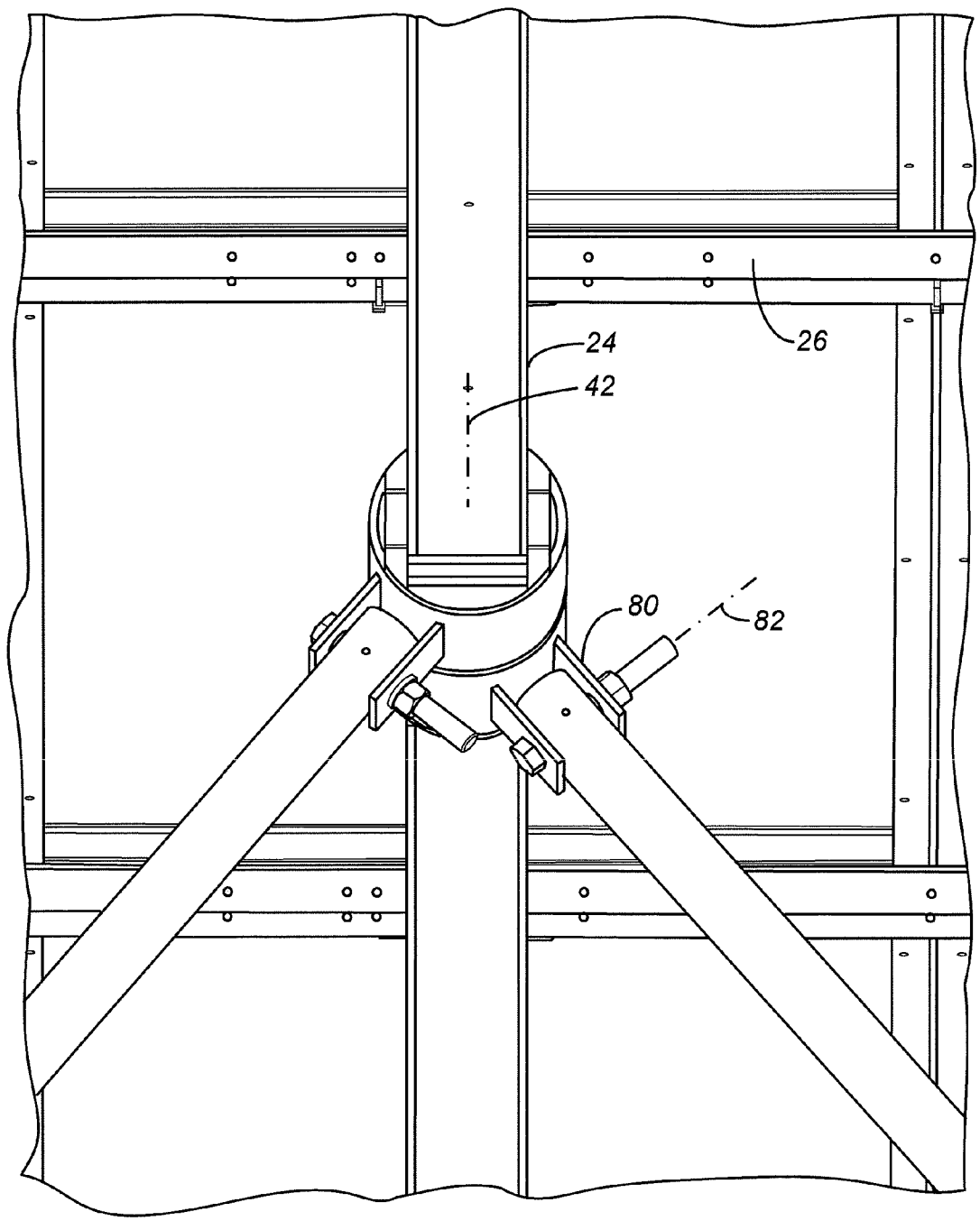

Referring now to FIGS. 1, 8 and 9, north side support 18 includes second surface mounts 66, sometimes referred to as north bases 66, resting on support surface 14. North side support 18 includes a support strut 70 extending from each north base 66 and pivotally secured to north end 68 of torque member 24 by a north bearing assembly 72. As with south side support 16, north bases 66 are anchorless, ballast type bases designed to be sufficiently heavy to secure the north end 68 of torque member 24, and therefore solar collector module assembly 12, against wind and other forces without need to excavate or otherwise anchor the north bases to support surface 14. North base 66 is typically made of concrete.

The required weight for south base 28 and each north base 66 will depend upon various factors including the size and configuration of assembly 12, expected wind speeds, expected wind directions, and tilt angle 32. For example, for solar collector assemblies having a surface area of about 9.3 to 37 square meters (100 to 400 sq. ft.) oriented at a tilt angle 32 (see FIG. 5) of 20°, each north base 66 may have a weight of at least 2270 kg (5000 lbs.).

Figure 1A:
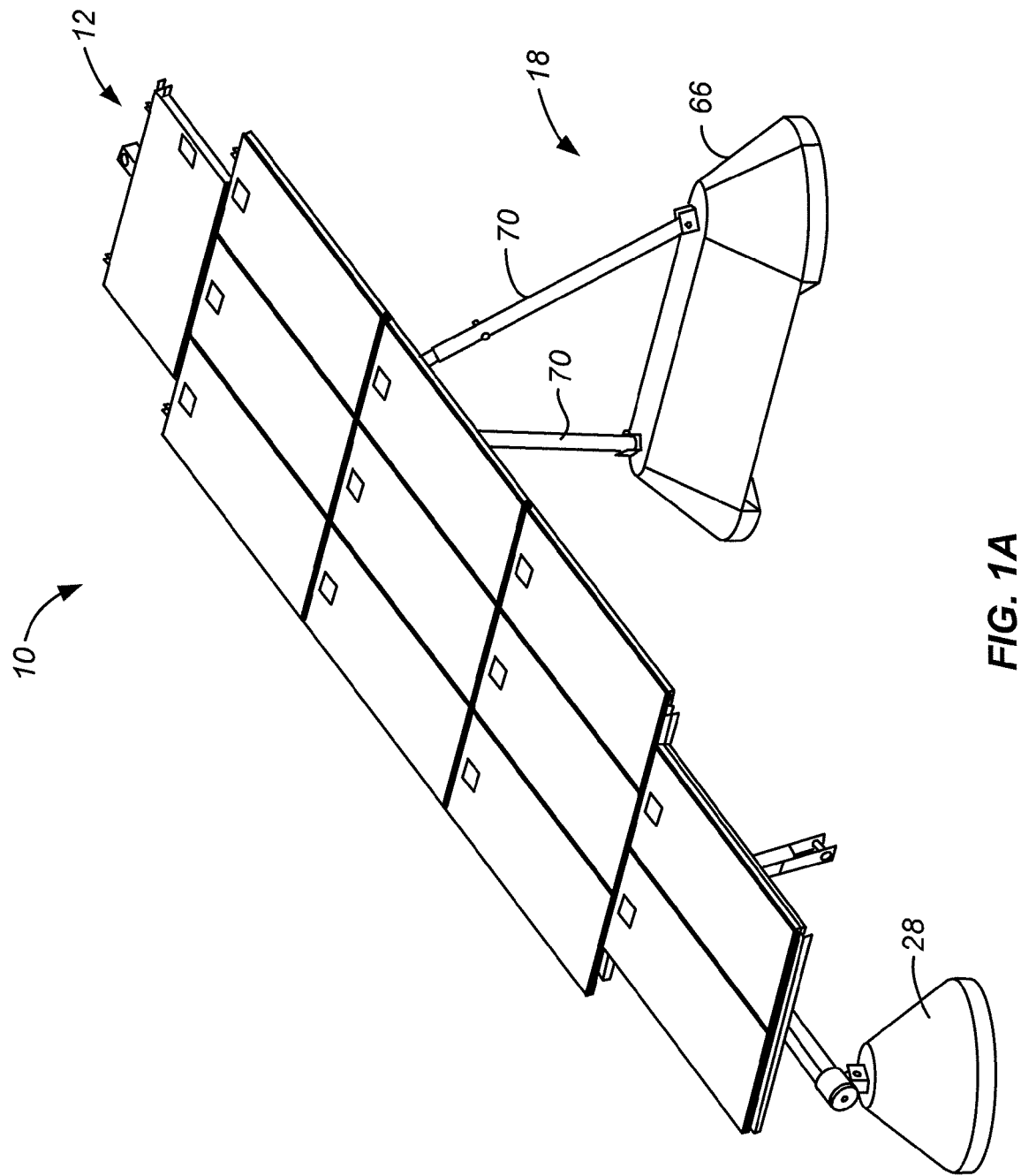
FIG. 1A is a front, right side, top view showing another example of a solar collector assembly.
Figure 2:
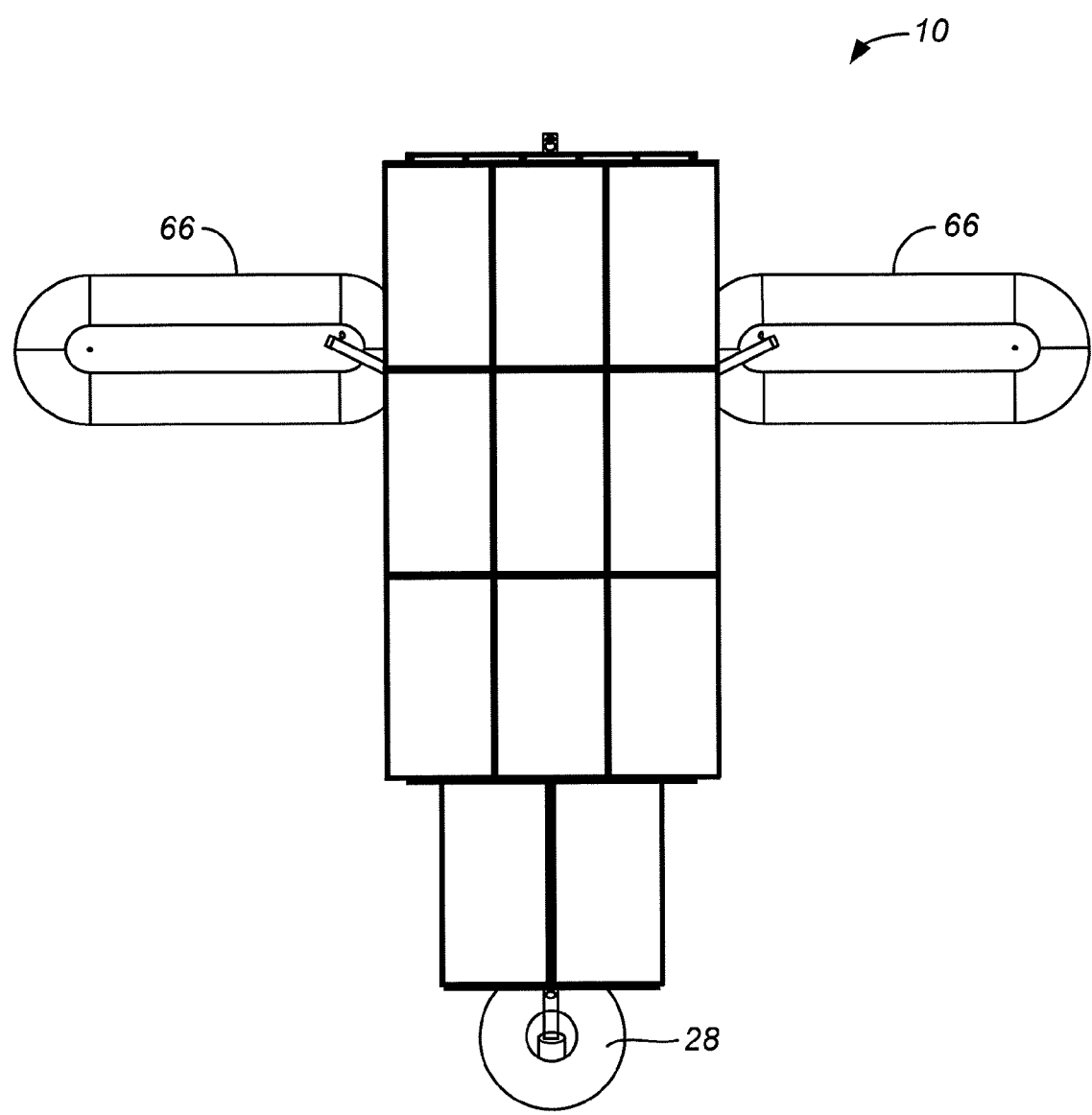
FIGS. 2-5 are top plan, front elevational, rear elevational and left side elevational views of the solar collector assembly of FIG. 1.
Figure 3:
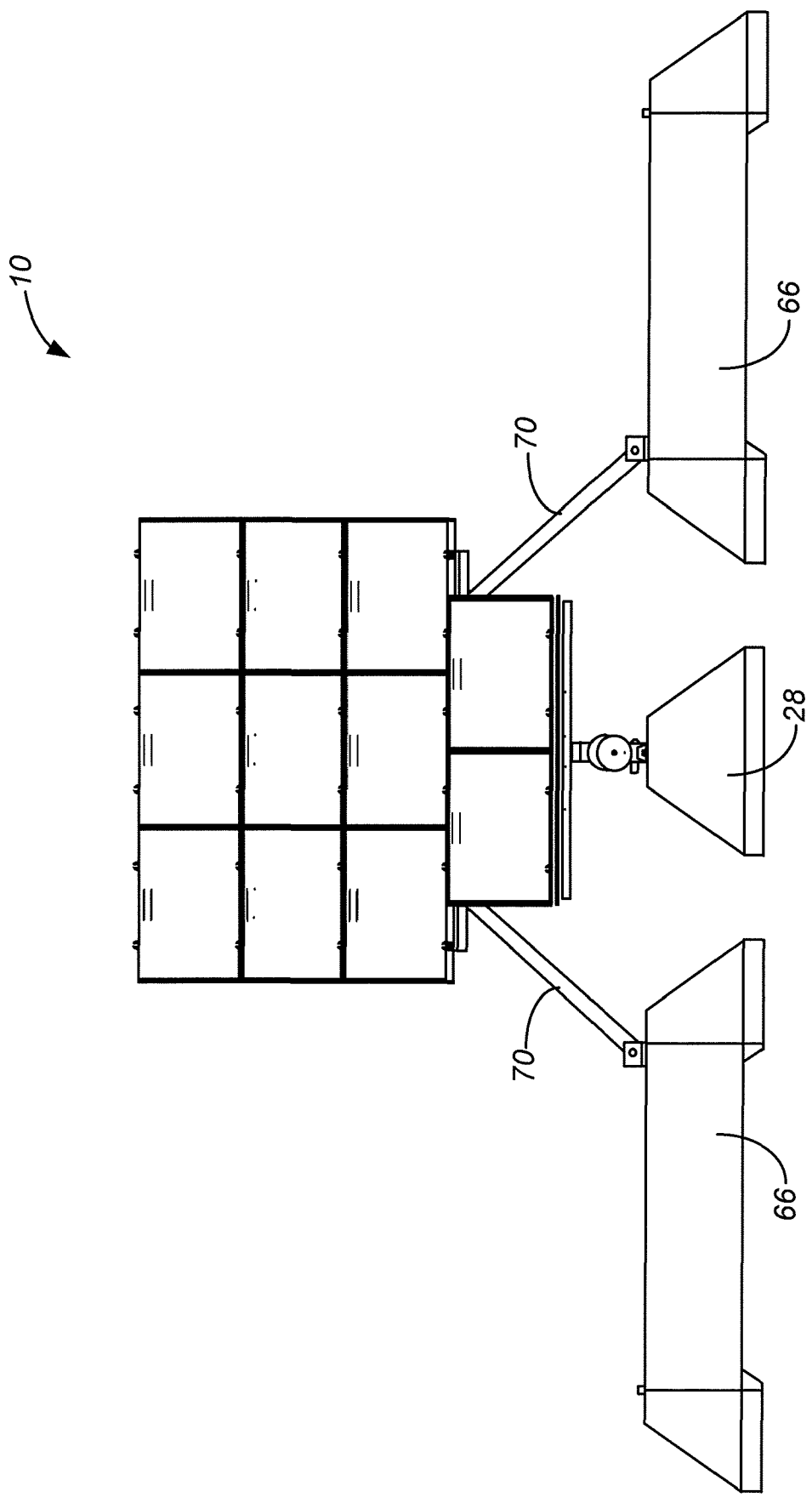
Figure 10:
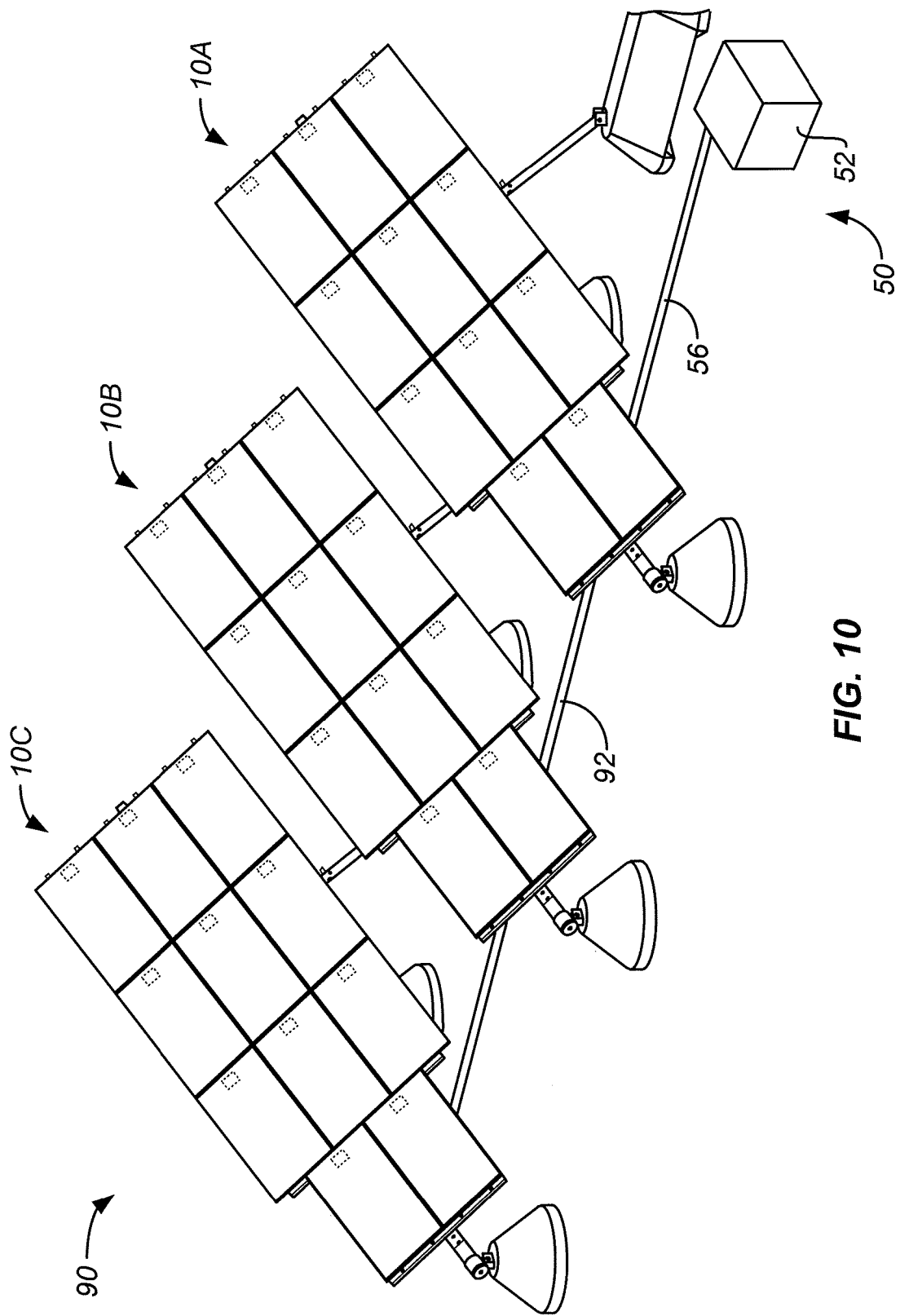
FIG. 10 is a front, right side, top view of one end of a row of the solar collector assemblies of FIG. 1 shown in a morning, generally east-facing orientation.
Figure 11:
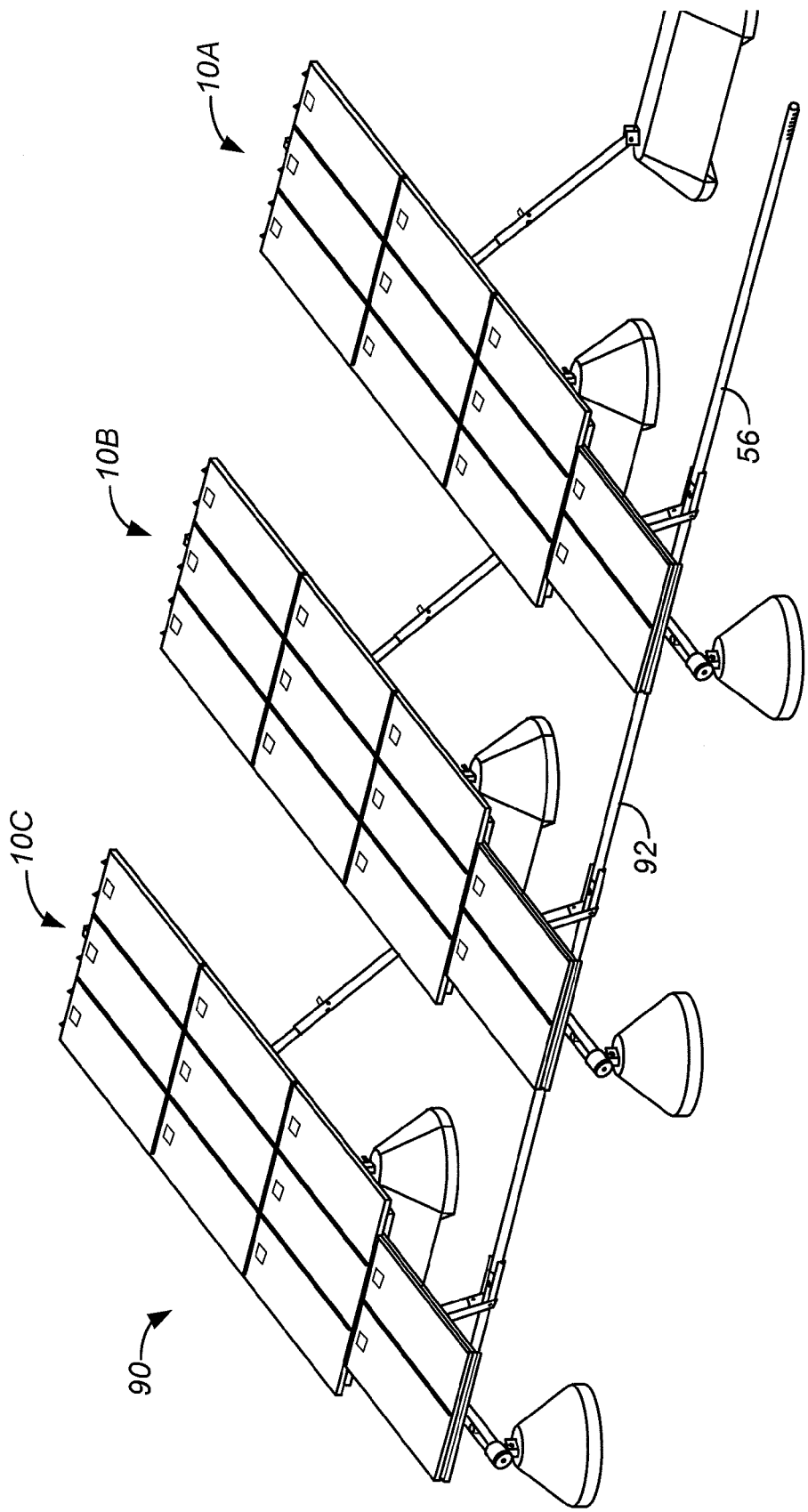
FIG. 11 illustrates the row of solar collector assemblies of FIG. 10 and a noontime orientation.
Figure 12:
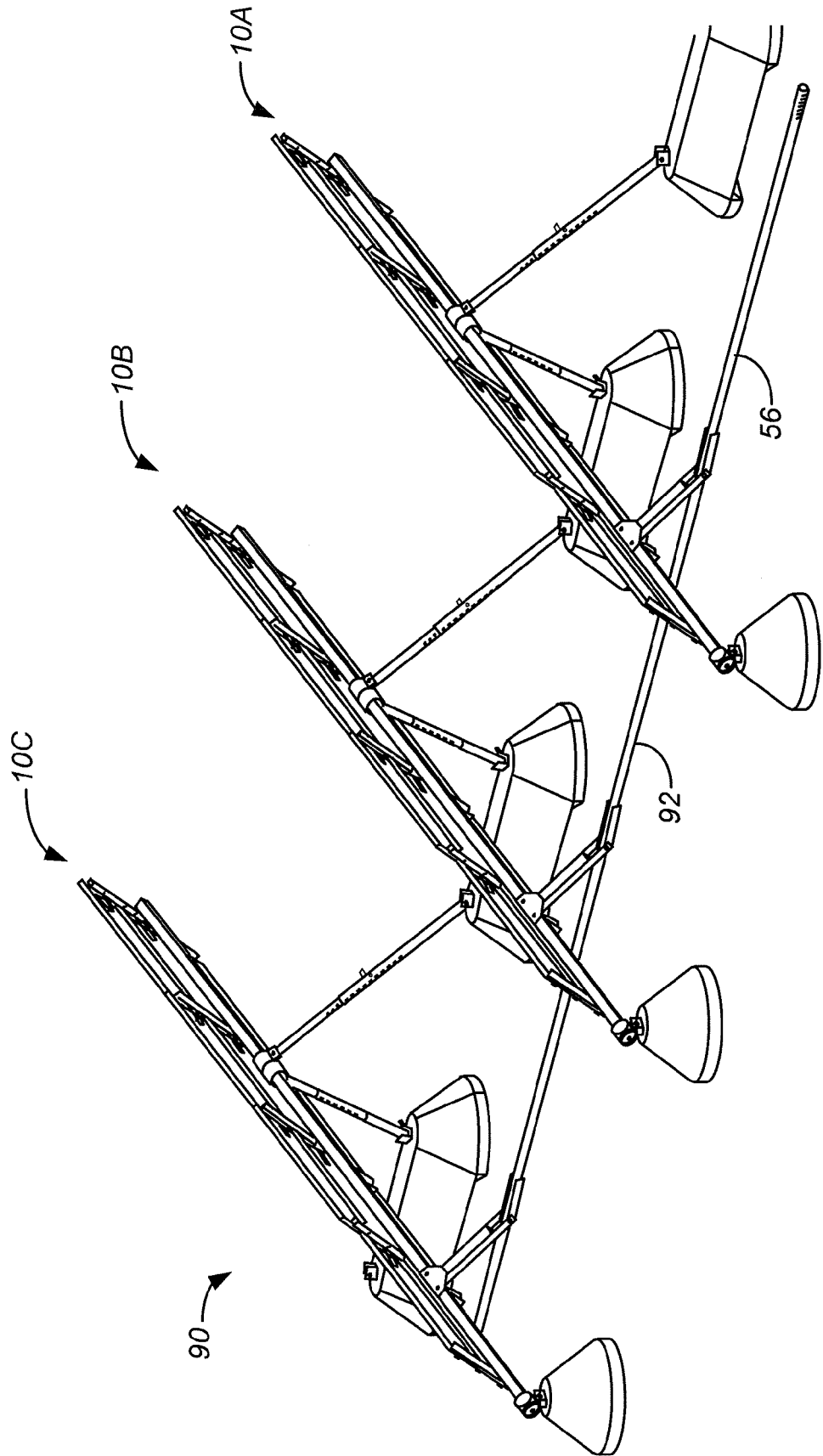
FIG. 12 illustrates the row of solar assemblies of FIG. 10 in evening, generally west-facing orientation.

One of the advantages of north side support 18 is that north base 66 can function as a shared, unitary north base when used between adjacent solar collector assemblies 10 in a row 90 of assemblies 10. In the example of FIGS. 10-12, the north base 66 between assembly 10A and assembly 10B and between assembly 10B and assembly 10C are shared, unitary north bases. This is important because loads, in particular wind loads, on assemblies 10 are not the same and are typically constantly changing. Therefore, loads, in particular lateral loads, exerted on assemblies 10 in the same row 90 can be distributed among the other assemblies in the row through north bases 66. Therefore, the total weight of all of the north bases 10 in row 90 can be less than if north bases were not shared between adjacent solar collector assemblies 10 while making the possibility of overturning solar collector assemblies 10 highly unlikely. In other examples, instead of using north base 66 as a shared base, each north base 66 would be used with a single solar collector module assembly 12; see FIG. 1A. In addition, a combination of the two can be used in a single row 90 with only some of solar collector assemblies 10 sharing a north base 66.

Each north bearing assembly 72 is similar to south bearing assembly 36 and includes an inner bearing member 74 affixed to torque member 24 and an outer bearing member 76 rotatably mounted over inner bearing member 74 so to be free to pivot about tilt axis 42. The upper end of 78 of each support strut 70 is pivotally mounted to outer bearing member 76 by a clevis-type strut mount 80 so that support strut 70 can pivot about a strut mount axis 82. The lower end 84 of support strut 70, see FIG. 4, is pivotally mounted to north base 66 by a north pivot mount 86. North pivot mount 86 is substantially the same as south pivot mount 44 and permits support strut 70 to pivot about a generally horizontal axis corresponding to south pivot axis 46. In addition, north pivot mount 86 can be rotated about a generally vertical axis to aid securing support strut 70 to torque member 24 and north base 66. Support struts 70 are also variable length, telescoping struts. The pivotal connections between support strut 70 and torque member 24, the pivotal connections between support strut 70 and north base 66, and the use of the variable length, telescoping struts 70 enhances the ease of installation of solar collector assembly 10 because exact placement of north bases 66 is not required nor must support surface 14 be extensively graded or otherwise prepared to accept the north bases. The ability to place north and south bases 66, 28 without substantial excavation, that is with only that excavation required to provide a stable support surface for the ballast-type north and south bases, provides a significant cost advantage during installation.

Figure 7:
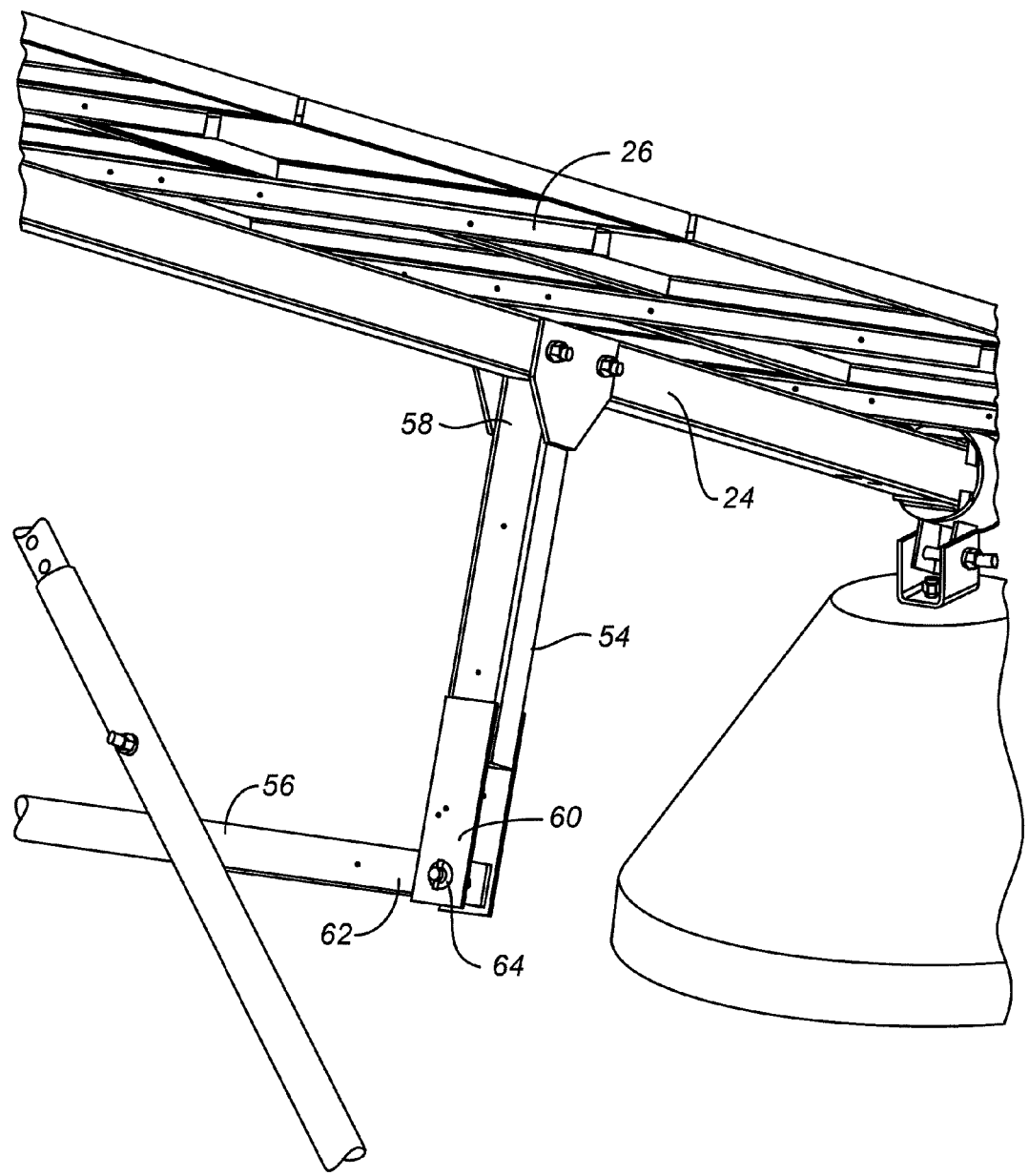
FIG. 7 is an enlarged view of a portion of the underside of the assembly of FIGS. 1-5 illustrating the distal end of the drive rod pivotally connected to the outer end of the drive element, the inner end of the drive element secured to the torque member.
Figure 7A:
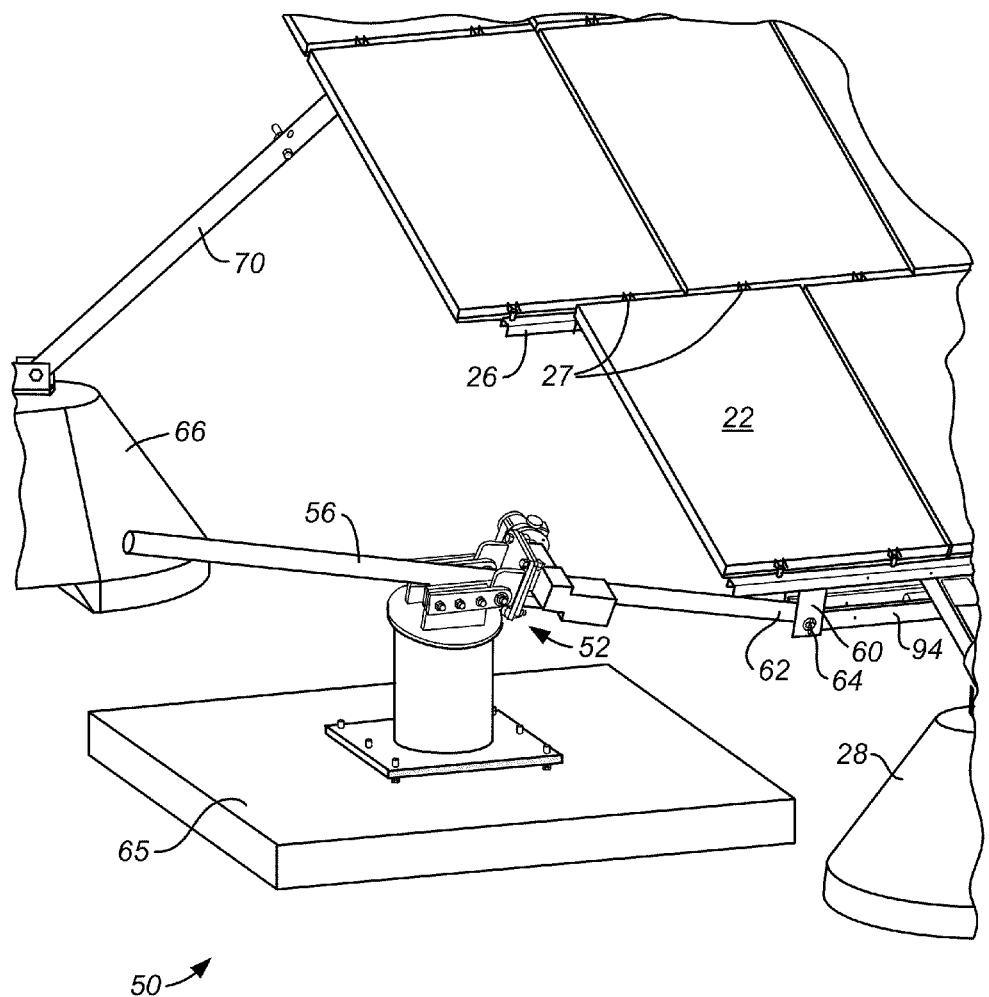
FIG. 7A is an enlarged view of a portion of FIG. 1 showing the driver.
Figure 7B:
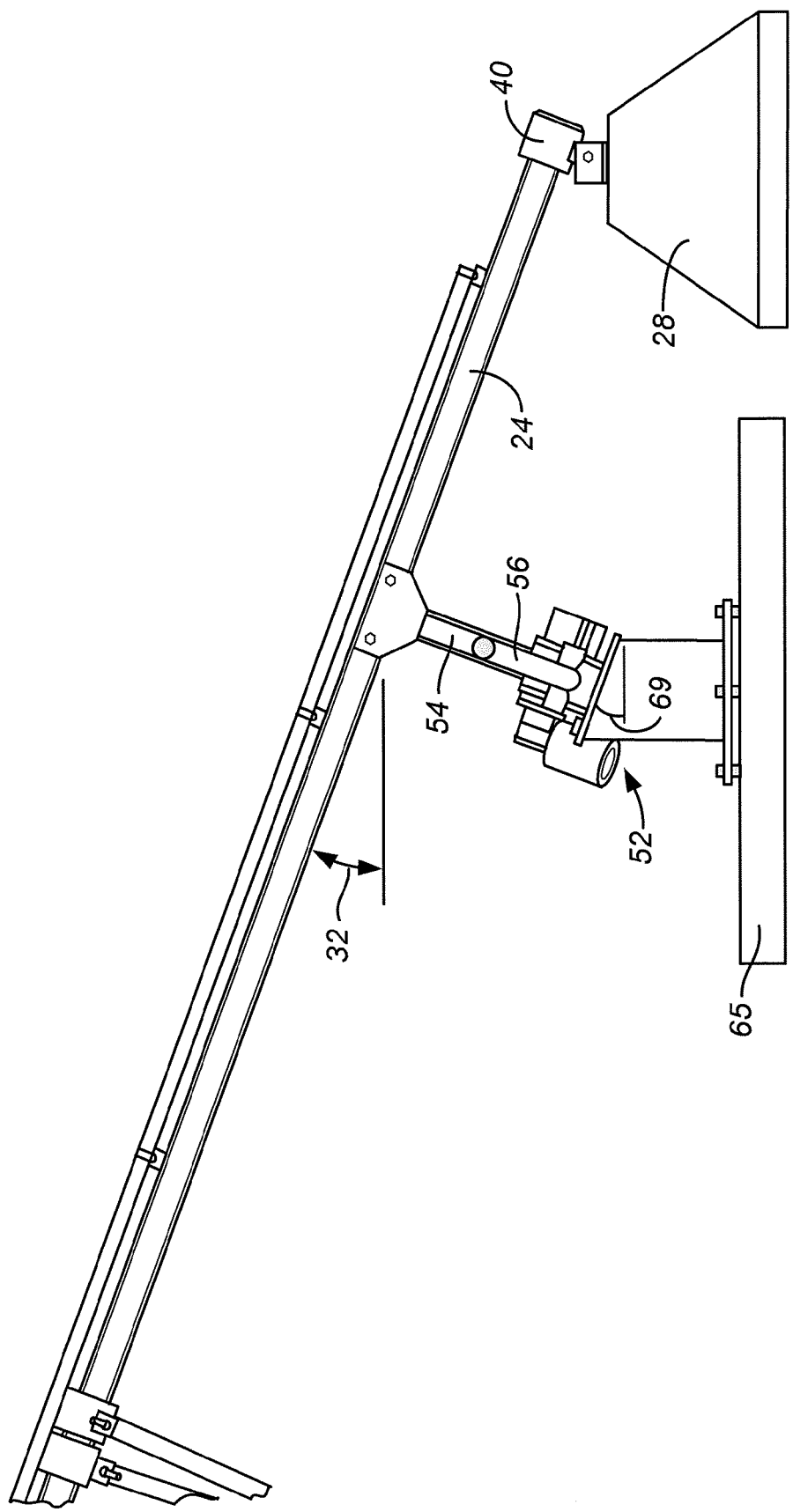
FIG. 7B is a partial left side elevational view of the structure of FIG. 1 showing the angular orientation of the driver.

Referring now to FIG. 1, solar collector module assembly 12 is pivoted about tilt axis 42, thus allowing the assembly to follow the movement of the sun during the day, by a tilt assembly. FIGS. 7, 7A and 7B show one example of a tilt assembly 50 while FIGS. 27, 28 and 29 show another, and presently preferred, example of a tilt assembly 400.

Tilt assembly 50 includes a driver 52 connected by a drive rod 56 to a torque arm type of drive element 54 extending from torque member 24. The inner end 58 of drive element 54 is secured to torque member 24 and extends from the torque member generally perpendicular to a plane defined by solar collector modules 22. Drive element 54 includes a clevis-type outer end 60 which receives the clevis-type distal end 62 of drive rod 56 with ends 60, 62 pivotally secured to one another by a pivot element 64, typically a round pin secured by two roll pins. Driver 52 causes drive rod 56 to move in a generally linear, generally horizontal fashion; this movement causes outer end 60 of drive element 54 to rotate about tilt axis 42 thus allowing solar collector modules 22 to generally follow the sun.

Driver 52 is mounted to a footing or foundation 65 which, like south base 28 and north base 66, is typically concrete and is heavy enough not to require burying within the ground. As shown in FIG. 7B, driver 52 is oriented at an angle 69 equal to tilt angle 32 to best accommodate the motion of outer end 60 of drive element 54. Therefore, it is typically desired that foundation 65 be generally horizontal. However, the need for foundation 65 to be generally horizontal can be eliminated by constructing tilt assembly 50 in a manner to eliminate this requirement. For example, the angular orientation between driver 52 and foundation 65 can be made to be adjustable.

Figure 19:
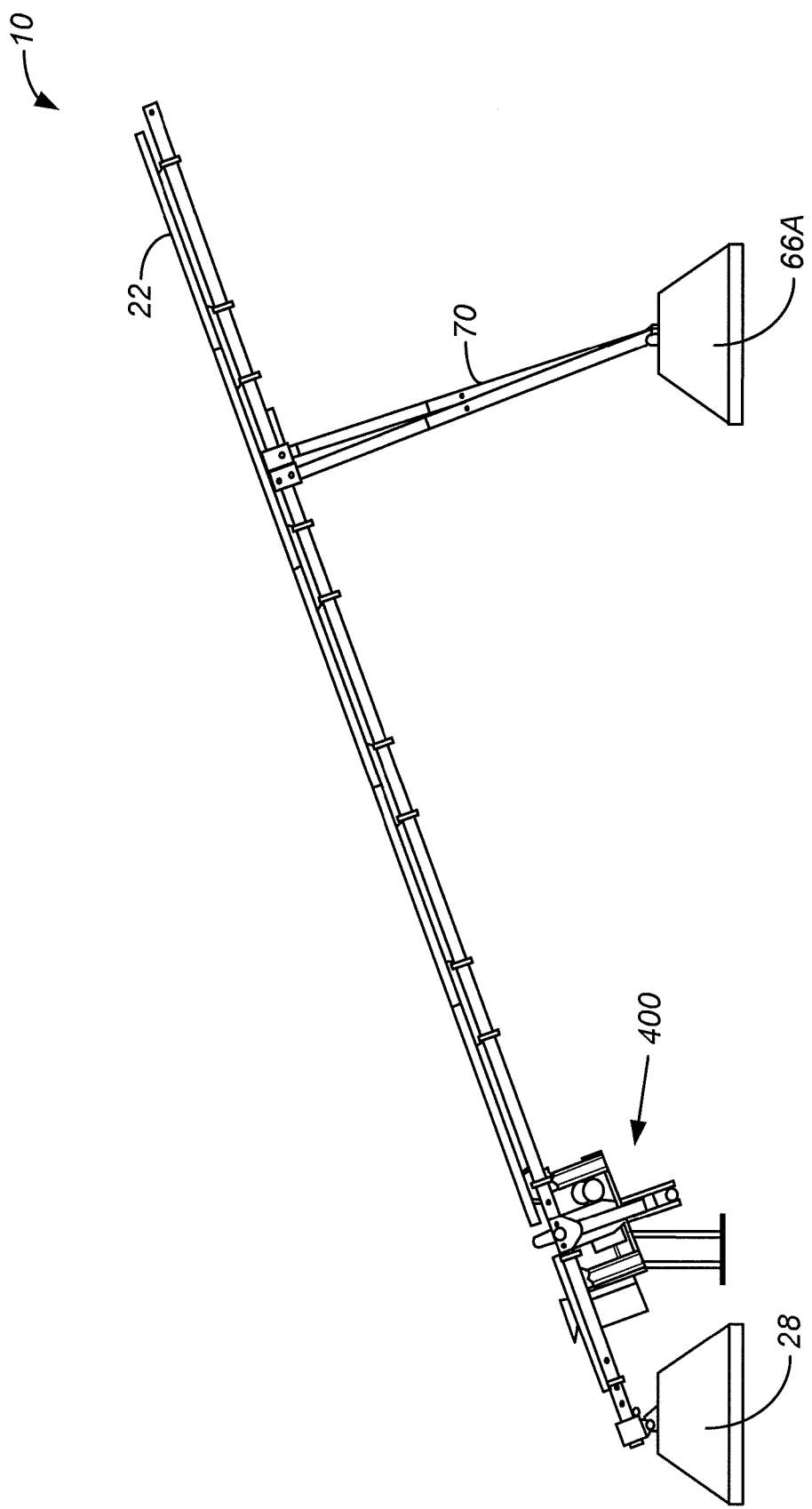
FIG. 19 is a side elevational view of the row of solar collector assemblies shown in FIG. 18.
Figure 20:
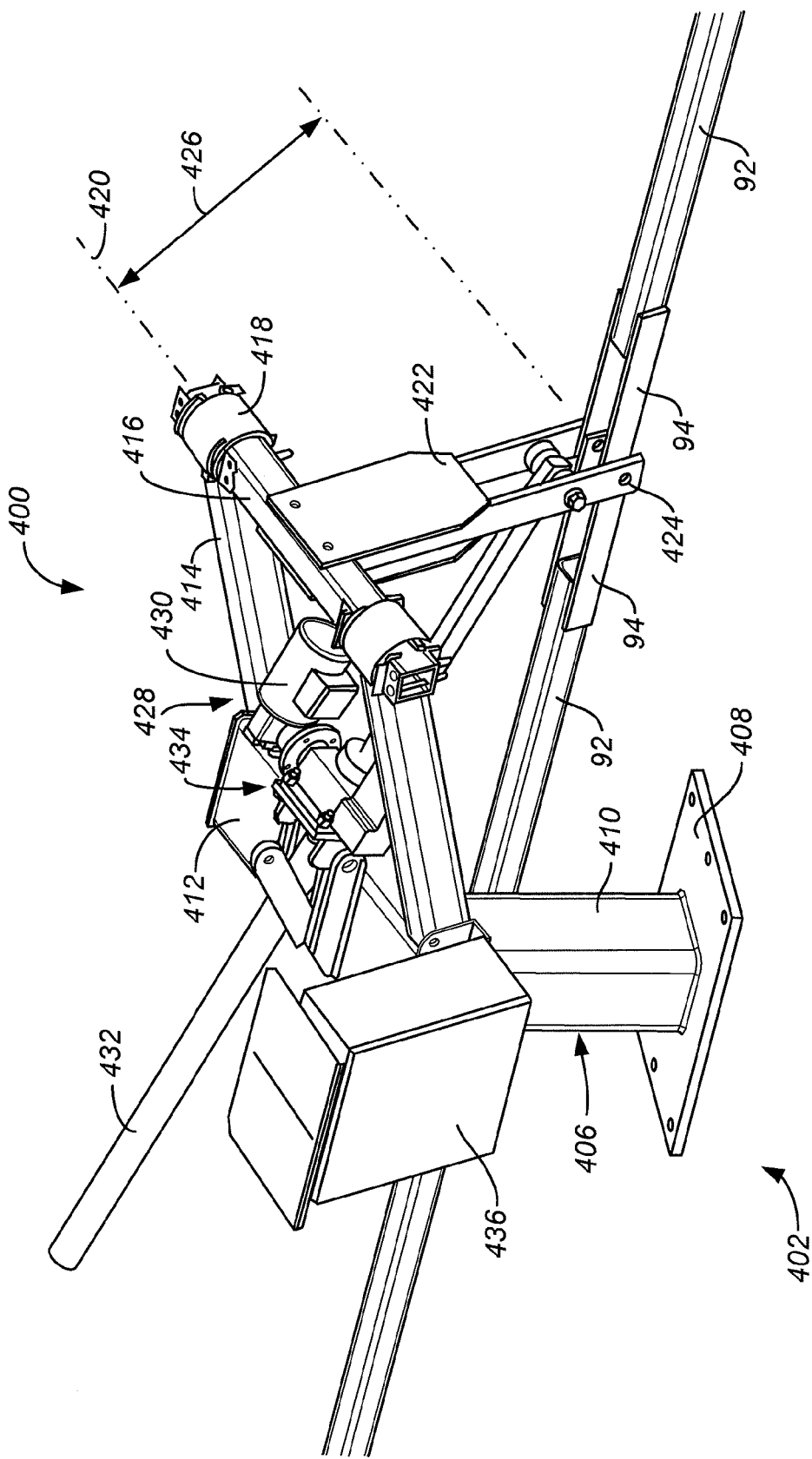
FIG. 20 is an enlarged overall view of a tilt assembly for use with the embodiments of FIGS. 18 and 19.
Figure 21:
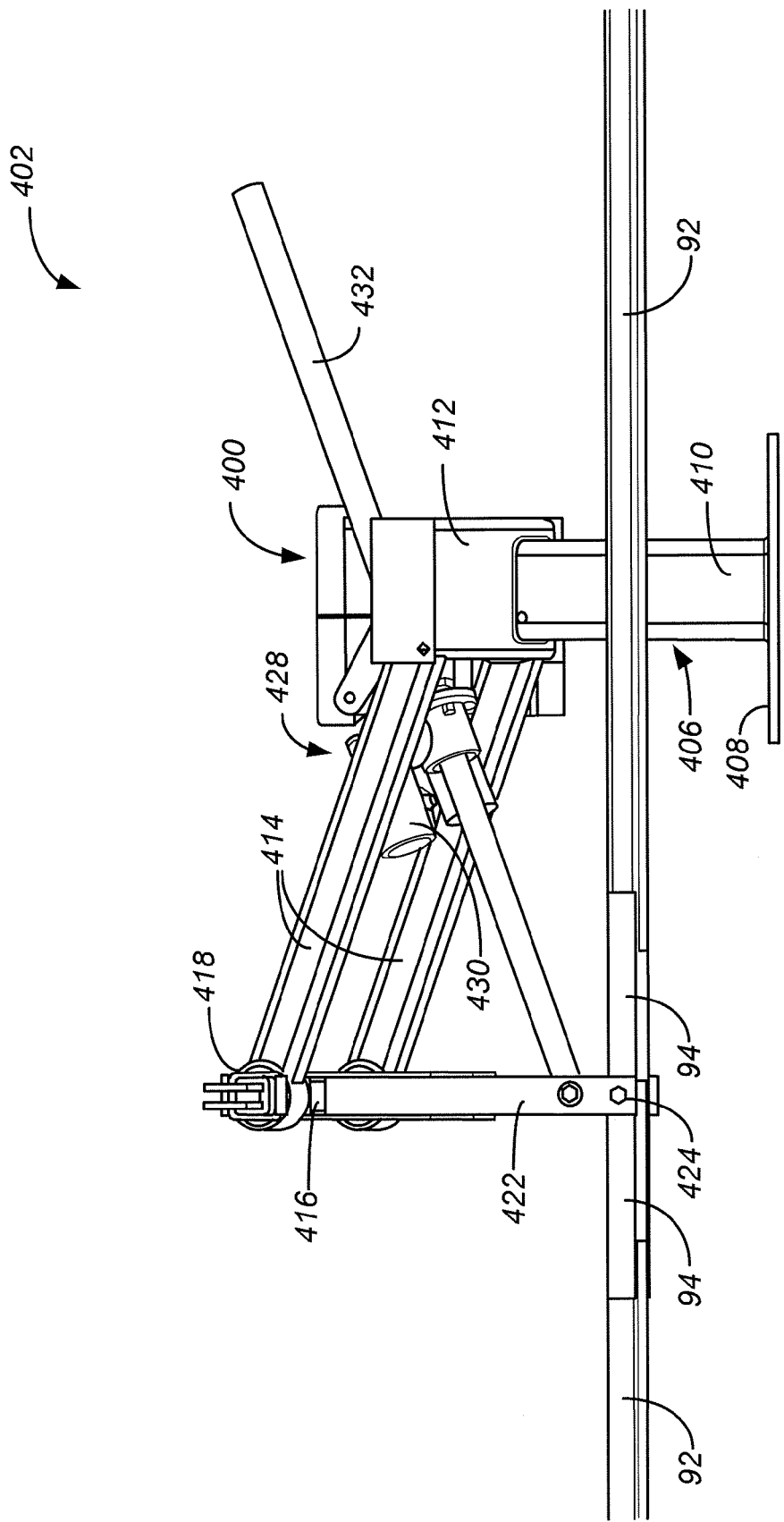
FIG. 21 is a rear elevational view of the tilt assembly of FIG. 20.

FIGS. 19, 20 and 21 illustrate a tilt assembly 402 comprising a driver 400 and drive element couplers 92. Driver 400 is connected to and drives drive element couplers 92. Drive element couplers 92 extend to drive elements 54, see FIG. 13, of the solar collector assembly 10 on either side of tilt assembly 402. Driver 400 includes a drive frame 406 including a base 408 adapted to be secured an appropriate foundation or other support, not shown. The foundation could be an above-ground structure or a fully or partially buried structure. For example, base 408 could be bolted, welded or otherwise secured to a large, heavy steel plate with, or without, rods or spikes driven into the earth. Other examples for the foundation include a screw-in foundation, a vibration or pressure (or both) driven tube or tubes, and a ballasted vessel filled with (typically local) soil or gravel.

Drive frame 406 also includes a generally vertical post 410 and a transversely extending member 412 extending from the upper end of post 410 to create a generally L-shaped structure. Member 412 extends upwardly and outwardly at an angle to the horizontal generally equal to the inclination of tilt axis 42. A pair of support arms 414 extend from either end of member 412. A drive arm support 416 is mounted to the distal ends of support arms 414 by bearings 418. This permits drive arm support 416 to rotate about a drive arm axis 420. Drive arm axis 420 is arranged to be generally parallel to and generally laterally aligned with pivot axes 42 of the solar collector assemblies 10 on either side of tilt assembly 402.

Driver 400 also includes a drive arm 422 extending from drive arm support 416 and connected to the clevis-type ends 94 of drive element couplers 92 at a drive position 424. The distance from drive position 424 to drive arm support axis 420 is termed second distance 426. Second distance 426 is equal to a first distance measured between pivot element 64 and tilt axis 42 passing through the center of torque number 24; see FIGS. 7 and 13.

Driver 400 also includes a drive arm driver 428 including a motor 430 connected to a drive rod 432 by a gear arrangement 434. The gear arrangement 434 typically uses a worm gear reduction to a screw jack; however drive rod 432 can also be driven by a hydraulic pump and jack or other actuation devices. The configuration of tilt assembly 402, and especially drive frame 406, permits drive element couplers 92 to freely pass beneath a portion of the drive frame. Drive frame 406 accomplishes this in a cantilevered fashion using a single post 410; however, drive frame 406 could be otherwise configured, such as with a post 406 on both sides of drive element couplers 92, to provide this feature. Driver 400 also includes an enclosure 436 containing an electronic controller used to control the actuation of motor 430 throughout the day.

Tilt assembly 402 provides several advantages over tilt assembly 50. When using tilt assembly 50, certain forces, specifically non-horizontal forces acting on the solar collector module assemblies 12, are exerted by drive elements 54 on torque members 24 of solar collector assemblies 10 and increase towards the end of the row away from tilt assembly 50. Constructing driver 500 so that the working length of drive arm 422, that is second distance 426, is the same as the working length of drive element 54, and arranging the location and orientation of drive arm support axis 420 to be aligned with tilt axes 42, causes drive arm 422 to go through the same motions as drive elements 54. Drive arm 422 thus mimics the movement of drive elements 54; this effectively eliminates this transfer of an increasing force from one solar assembly 10 to the adjacent solar assembly 10 when the solar assemblies are all in line. Placing driver 400 midway along row 90 of solar collector assemblies 10, which is a known technique, allows a single driver 400 to drive twice the number of solar collector assemblies 10 while using the same strength drive element couplers 92 as the drive element coupler 92 needed adjacent to drive rod 56 of the embodiment of FIG. 1. Placing driver 400 midway along row 90 of solar collector assemblies 10 also increases the number of solar collector assemblies 10 that can be driven by a single driver when the number of solar collector assemblies 10 that can be driven by a single driver is limited by the effects of thermal expansion.

The operation of drivers 52, 400 can be preprogrammed and adjusted to the particular location of the solar site. The location can be determined using information from a GPS device. Also, the operation of drivers 52, 400 can be controlled remotely as a matter of course. One benefit of remotely controlling all the solar collector assemblies 10 from a central electronic controller is a reduction in the cost of the entire installation by not needing a fully functional electronic controller at every solar collector assembly 10, just a simplified controller at each assembly 10 and a fully functional central electronic controller. Another benefit would be that the operator would not need to physically go from assembly 10 to assembly 10 to do any sort of maintenance on the electronic controllers associated with each assembly 10, which can prove to be very time consuming at large sites. Also, the user would not need to enter site parameters for every row; rather, it would be accomplished at the central electronic controller. Solar collector assemblies 10 are designed to be strong enough so as not to need to be tilted to a safe tilt angle (stowed) during high winds conditions. However, using a central electronic controller would facilitate stowing solar collector assemblies 10 during wind events.

Figure 13:
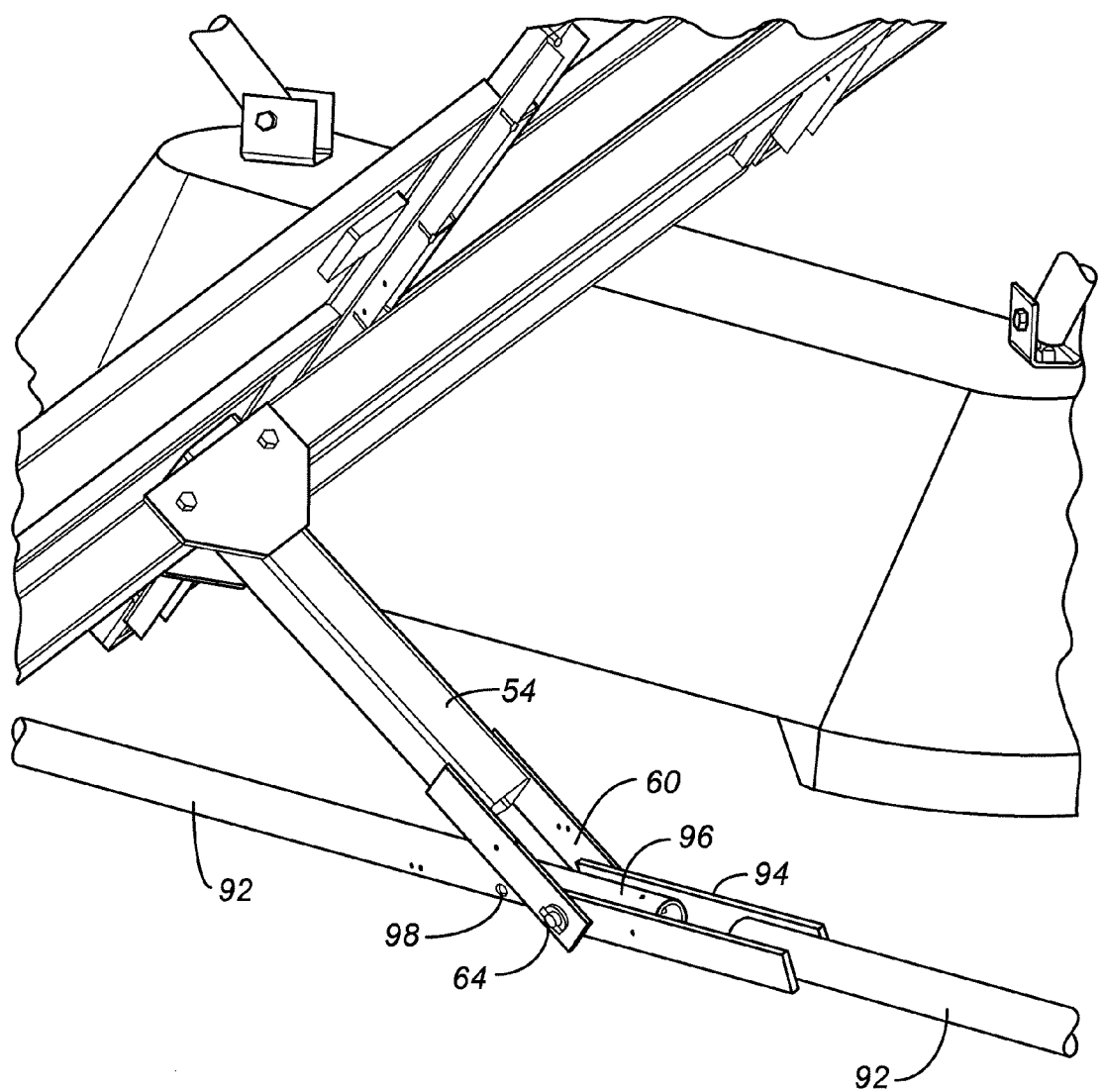
FIG. 13 is an enlarged view of a portion of FIG. 12 showing the pivotal connection of drive element couplers to the outer end of the drive element of the middle solar collector assembly.
Figure 14:
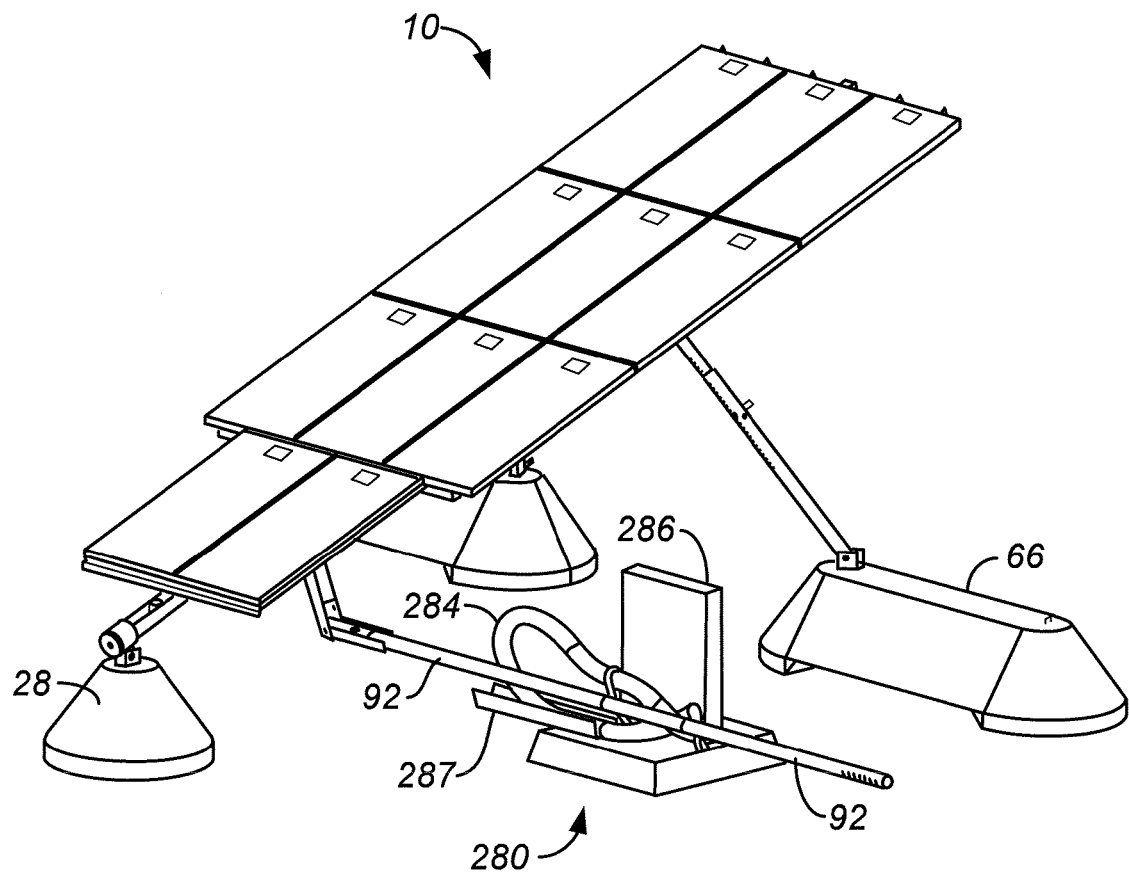
FIGS. 14-17 show the structure of FIG. 1 in which a combiner box assembly is used along a row of the solar collector assemblies.
Figure 15:
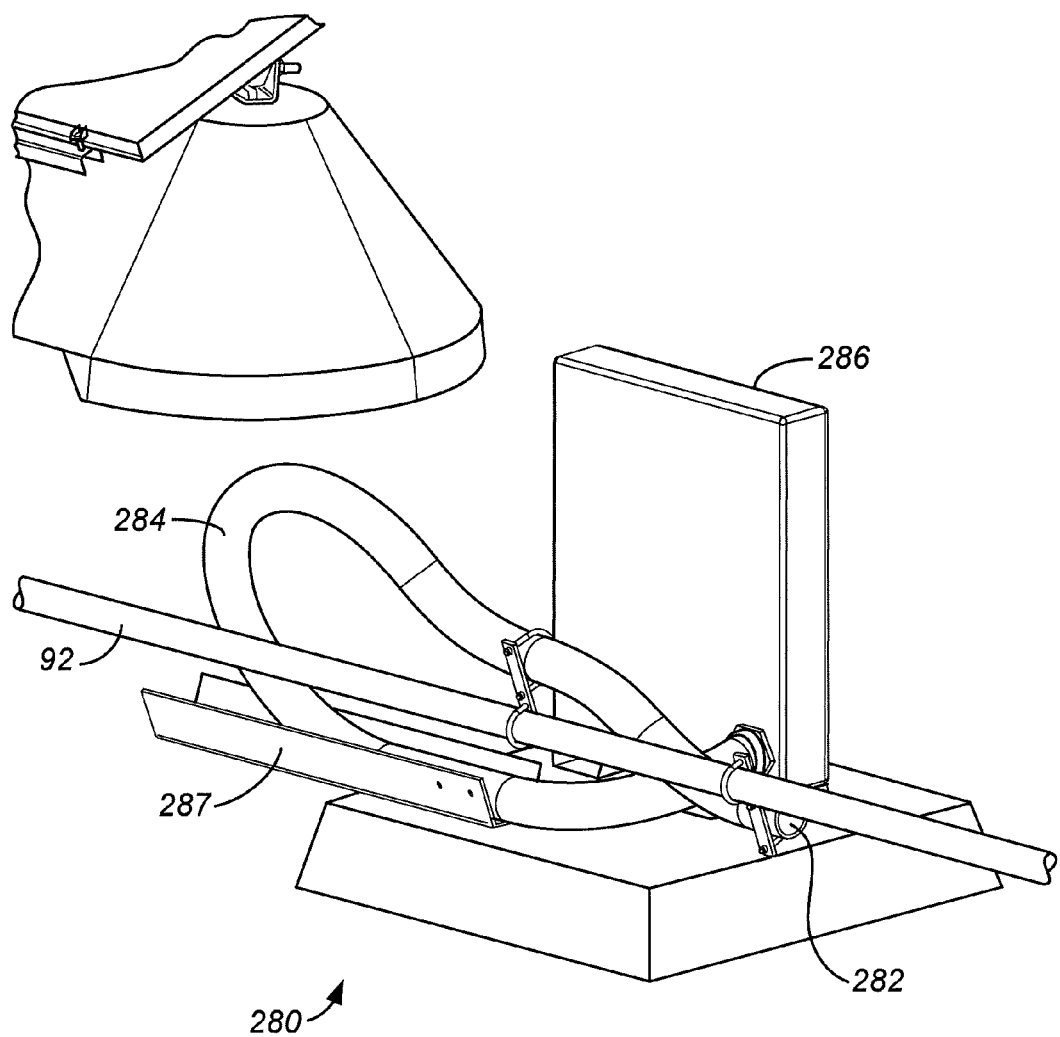
Figure 16:
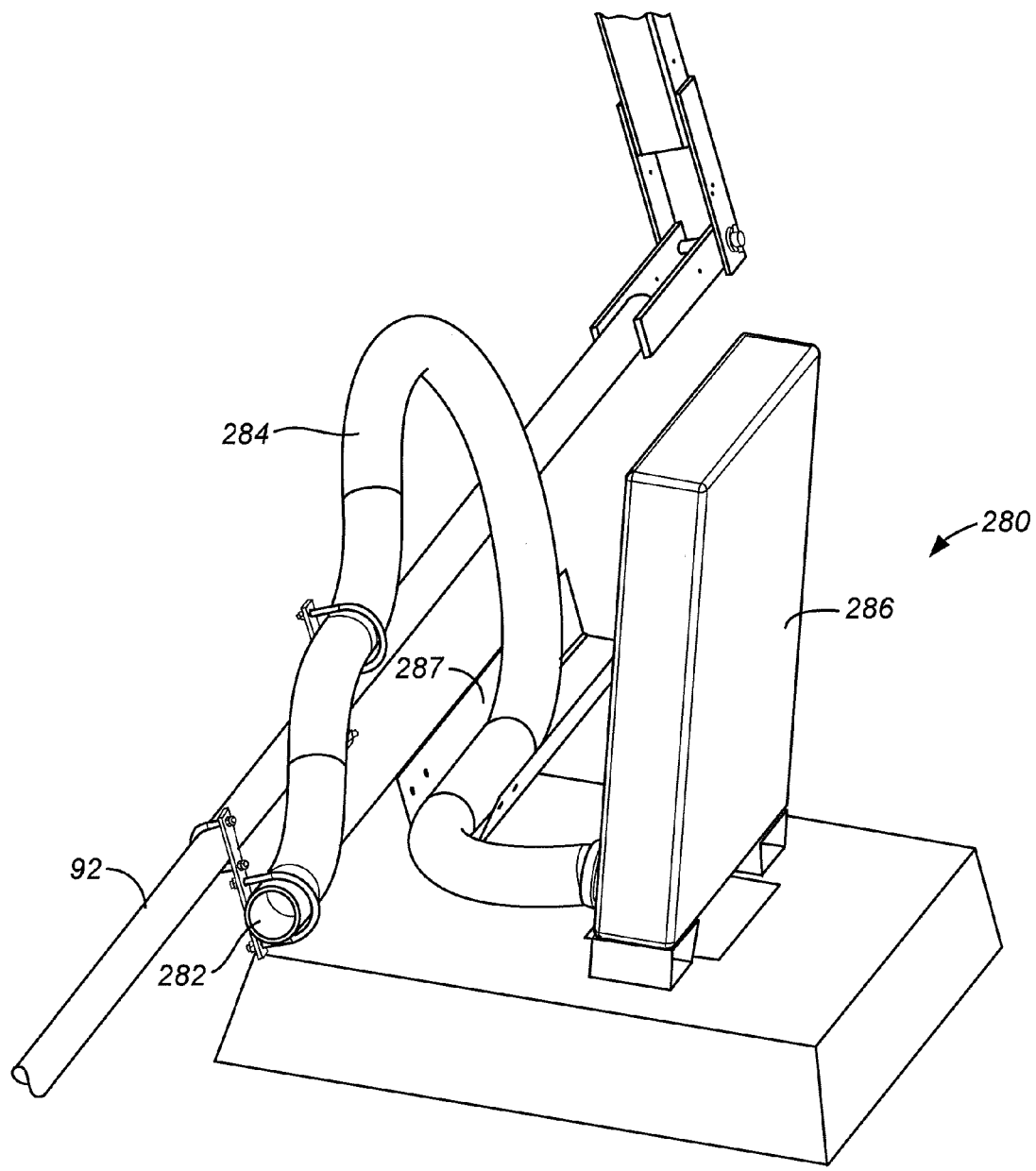

FIG. 10 shows a row 90 of solar collector assemblies 10A, 10B, 10C shown in a morning, generally east-facing orientation while FIGS. 11 and 12 illustrate row 90 in noon time and evening, generally west-facing orientations. Tilt assembly 50 includes driver 52 and drive rod 56 as is shown in FIG. 1. In addition, tilt assembly 50 includes drive element couplers 92 coupling the outer ends 60 of drive elements 54 of assemblies 10A, 10B and of assemblies 10B, 10C. FIG. 13 is an enlarged view of a portion of assembly 10B of FIG. 12 illustrating the pivotal connections between drive element couplers 92 and outer end 60 of drive element 54. Drive element couplers 92 are similar to drive rod 56 having one clevis-type end 94 and a plain, cylindrical end 96 sized to fit within the clevis type end 94. Cylindrical end 96 has a number of holes 98 to permit the effective length of couplers 92 to be changed. Other techniques for changing the length of couplers 92 may also be used. The use of the pivotal connections at outer ends 60 of drive elements 54 makes the alignment of assemblies 10 in a row 90 of assemblies much less critical. This helps to permit rows 90 of assemblies 10 to be used on uneven, undulating or other support surfaces 14 that are not flat without the need for extensive, and expensive, site preparation.

Figure 18:
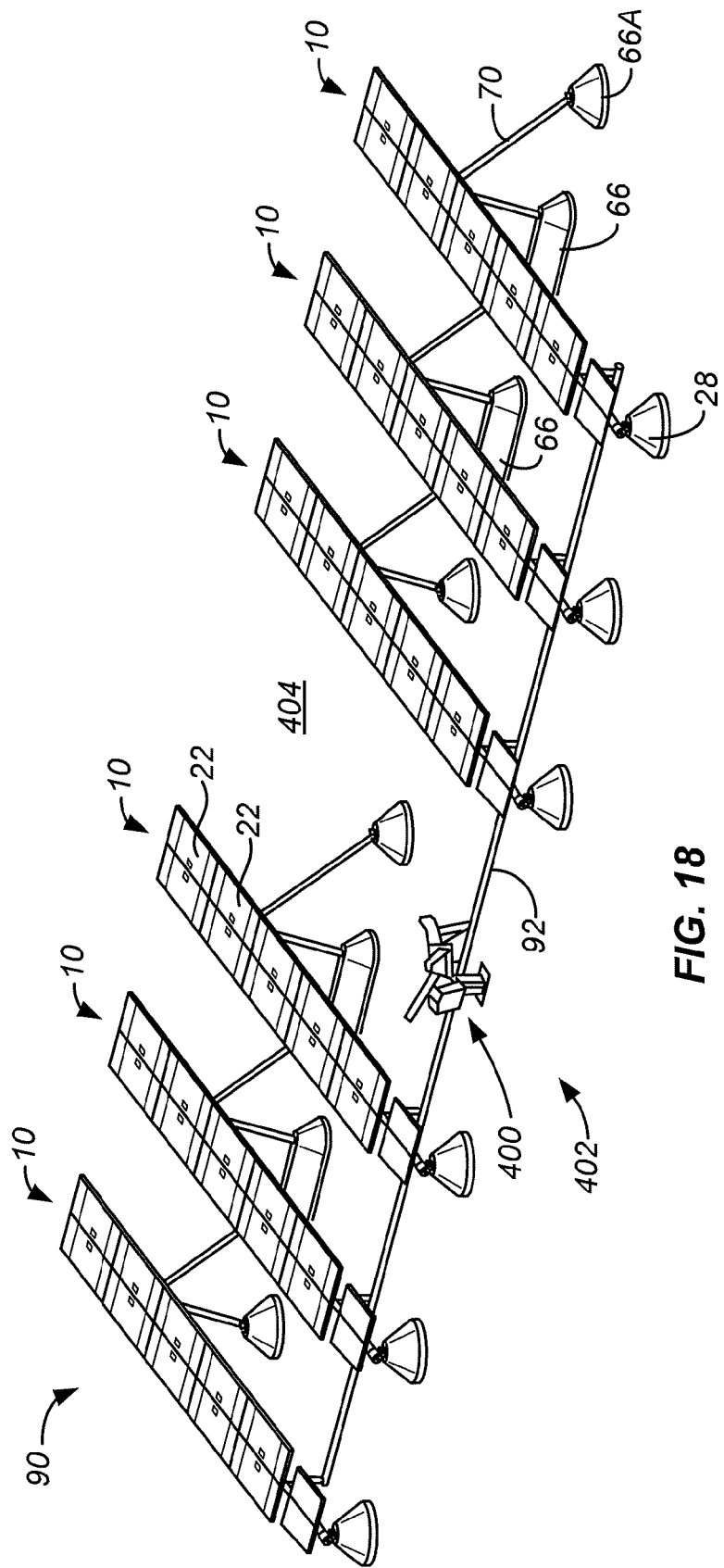
FIG. 18 is an overall view showing a further example of a row of solar collector assemblies.

A further example of a row 90 of solar collector assemblies 10 is illustrated in FIG. 18. Some of the differences between the example of FIG. 18 and that shown in FIGS. 1 and 11 include the use of a different arrangement for solar collector modules 22 and the use of a tilt assembly 402 midway along the row 90 instead of a tilt assembly 50 at the end of the row as shown in FIG. 1. The construction of, and advantages accruing through the use of, tilt assembly 402 has been discussed above with reference to FIGS. 19, 20 and 21.

In row 90, all solar collector assemblies 10 in FIG. 18 can be considered to be two rows of solar collector assemblies positioned along generally the same East-West path or line. Although three solar collector assemblies are shown one each side of tilt assembly 402 in row 90, in practice many more solar collector assemblies will typically constitute a single row 90. Another difference between row 90 of FIG. 18 and row 90 of FIG. 11 is the use of north bases 66 between adjacent solar collector assemblies 10 but the use of smaller north bases 66A, similar to south bases 28, at the ends of the rows and located in the gap 404 between assemblies 10 on either side of driver 400. It has been found that it is typically not necessary to use the larger north bases 66 when only a single support strut 70 is connected to the north base.

Figure 17:
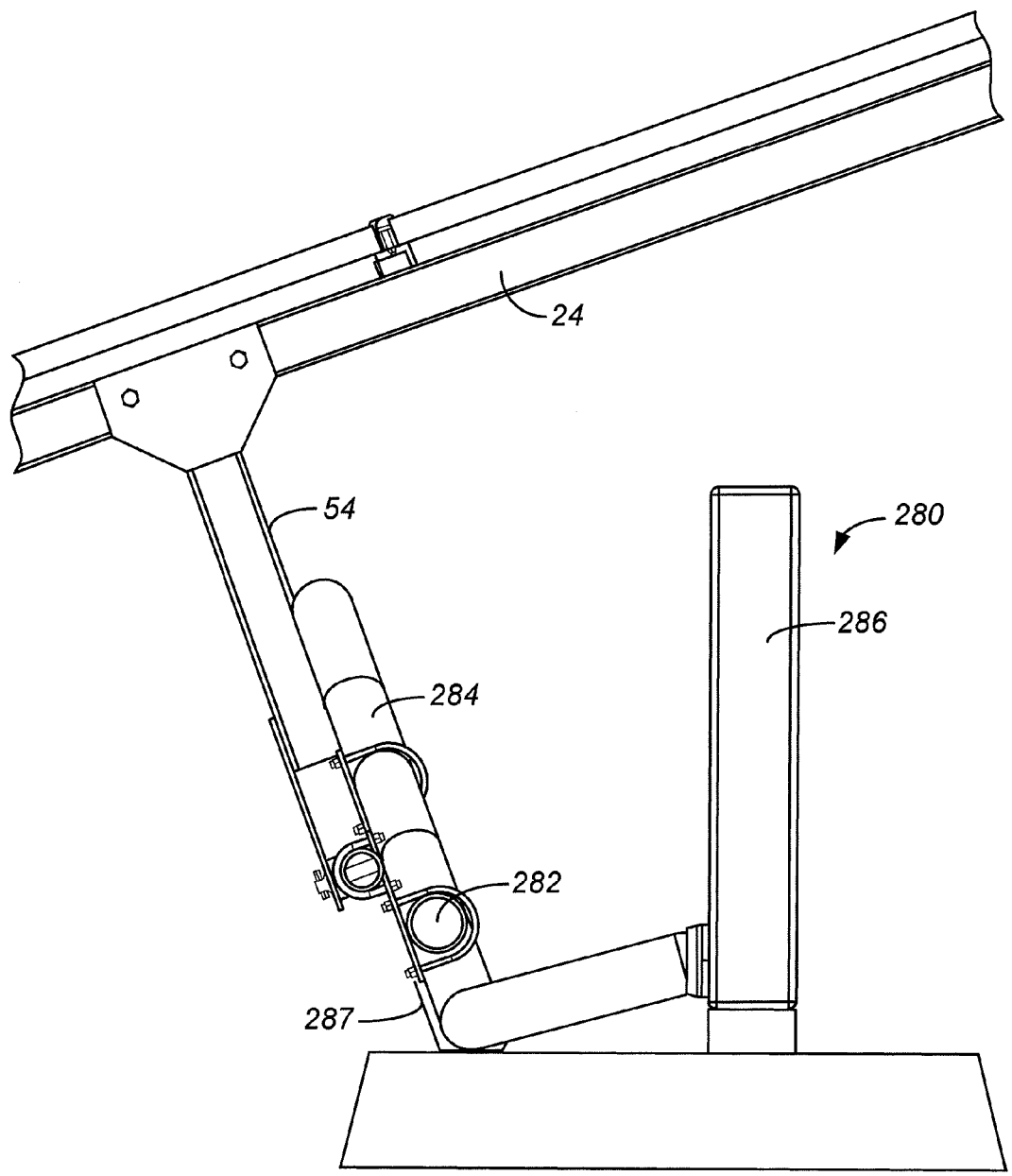

FIGS. 14-17 illustrate another example which uses a combiner box assembly 280 along each row of solar collector assemblies 10. Wires from each solar collector assembly 10 pass along drive element 54 and along drive element couplers 92 until reaching combiner box assembly 280. The wires, not shown in FIGS. 14-17, pass through an opening, not shown, in drive element coupler 92, into the open end 282 of a flexible hose 284, through flexible hose 284 and into combiner box 286. The proper movement of hose 284 is aided by the use of tray 287 which helps keep hose 284 from tangling, binding or reducing the minimum wire bend radius as drive element coupler 92 moves during the day. As shown in FIG. 17, the angular orientation of hose 284 is such as to generally lie in a plane parallel to drive element 54.

The determination of the weight for south bases 28 and north bases 66 can be made to be site-specific based upon the size and configuration of assemblies 12 or can be made based upon typical configurations for assemblies 12 and expected wind loads. The weight determination can be made by the final user or installer or by the manufacture of assemblies 12. One typical way for determining the weight of south and north bases 28, 66 is to provide the user or installer guidelines so that for a particular range of surface areas for assembly 12 oriented over a particular range of tilt angles, recommended weights for south and north bases 28, 66 can be provided for different ranges of expected wind speeds. Alternatively, the manufacturer can provide the user or installer with recommended weights for south and north bases 28, 66 based upon information for the particular installation.

The above descriptions may have used terms such as above, below, top, bottom, over, under, et cetera. These terms are used to aid understanding of the invention are not used in a limiting sense. The directions north and south have been used assuming the installation site is in the Northern Hemisphere. The more generic terms polar for north and equator or equatorial for south can be used to cover installation sites in both the Northern Hemisphere and the Southern Hemisphere.

Modification and variation can be made to the disclosed embodiments without departing from the subject of the invention. For example, torque member 24 may have a variety of cross-sectional shapes including round and square, may have a partially or fully solid interior, may be made of one or more materials, and may have its various structural features vary along its length. Torque member 24 and rails 26, which act as a support or frame for solar collector modules 22, could be replaced by other solar collector support structure, such as a rigid rectangular platform. Therefore, tilt assembly 50 could be secured to structure other than torque member 24. The solar collector support structure could be mounted so to tilt not about a fixed tilt axis 42 but, for example, about a range of instantaneous tilt axes.

Any and all patents, patent applications and printed publications referred to above are incorporated by reference.

The invention claimed is:

1. A tilt assembly, for use with a solar collector assembly of the type comprising a frame, supporting a solar collector, for movement about a tilt axis by pivoting a drive element between first and second orientations, the tilt assembly comprising:
    a drive element coupler connected to the drive element at a position along the drive element; and
    a driver comprising:
        a drive frame;
        a drive arm mounted to the drive frame for pivotal movement about a drive arm axis;
        the drive arm being pivotal between third and fourth orientations, the drive arm extending along a longitudinal direction and having a first portion pivotally supported by the drive frame and a second portion drivingly connected to the drive element coupler at a drive position along the drive arm, the drive position being spaced apart from the drive arm axis by a second distance; and
        a drive arm driver drivingly coupled to the drive arm at a position spaced apart from the drive position along the longitudinal direction for movement of the drive arm between the third and four orientations.

2. The assembly according to claim 1 wherein:
    the driver further comprises a drive arm support pivotally mounted to the drive frame for pivotal movement about the drive arm axis, the drive arm mounted to the drive arm support; and
    the drive arm driver is supported by the drive frame.

3. The assembly according to claim 1 wherein the drive element coupler is connected to the drive element at a position along the drive element spaced apart from the tilt axis by a first distance, and wherein the first and second distances are substantially the same.

4. The assembly according to claim 1 wherein the drive arm axis is orientable to be substantially parallel to the tilt axis.

5. The assembly according to claim 4 further comprising a second line defined by the second distance, the second line being orientable to be substantially parallel to a first line defined by the first distance, whereby movement of the drive arm mimics movement of the drive element.

6. The assembly according to claim 4 wherein the driver is configured such that movement of the drive arm between the third and fourth orientations substantially mimics movement of the drive element between the first and second orientations.

7. The assembly according to claim 1 wherein the drive frame is constructed so that the drive element coupler can pass beneath a portion of the drive frame as the drive arm pivots between the third and fourth orientations.

8. The assembly according to claim 1 comprising first and second drive element couplers extending in substantially opposite directions from the second portion of the drive arm, whereby the assembly can be used between adjacent solar collector assemblies in a row of solar collector assemblies.

9. A solar collector installation comprising:
    first and second, side-by-side, solar collector assemblies, each solar collector assembly comprising a frame, supporting a solar collector, for movement about a tilt axis by pivoting a drive element between first and second orientations, said tilt axes being generally parallel to one another; and
    a tilt assembly comprising:
        first and second drive element couplers, each drive coupler connected to a drive element at a position along said drive element spaced apart from the tilt axis by a first distance; and
        a driver positioned between the first and second solar collector assemblies, the driver comprising:
        a drive frame;
        a drive arm mounted to the drive frame for pivotal movement about a drive arm axis, the drive arm axis spaced apart from the tilt axis;
        the drive arm pivotal between third and fourth orientations, the drive arm having a first portion extending along a longitudinal direction of the drive arm, from the drive frame toward the first and second drive element couplers, and a second portion drivingly connected to the first and second drive element couplers at a drive position along the drive arm, the drive position being spaced apart from the drive arm axis along the longitudinal direction by a second distance; and
        a drive arm driver drivingly coupled to the drive arm at a position spaced apart from the drive position along the longitudinal direction for movement of the drive arm between the third and fourth orientations.

10. The assembly according to claim 9 wherein the first and second distances are substantially the same.

11. The assembly according to claim 9 wherein:
    the drive arm axis is substantially parallel to the tilt axis; and
    a second line defined by the second distance is substantially parallel to a first line defined by the first distance, whereby movement of the drive arm mimics movement of the drive element.

12. The assembly according to claim 9 wherein the drive frame is constructed so that the first and second drive element couplers can pass beneath a portion of the drive frame as the driver arm moves between the third and fourth orientations.

13. A tilt assembly, for use with a solar collector assembly of the type comprising a frame, supporting a solar collector, for movement about a tilt axis by pivoting a drive element between first and second orientations, the tilt assembly comprising:
    a drive element coupler connected to the drive element at a position along the drive element spaced apart from the tilt axis by a first distance; and
    a driver comprising:
    a drive frame;
    a drive arm mounted to the drive frame for pivotal movement about a drive arm axis, the drive arm axis spaced apart from the tilt axis and being orientable to be substantially parallel to the tilt axis;

the drive arm being pivotal between third and fourth orientations, the drive arm having a radially inward portion extending from the drive frame and a radially outward portion drivingly connected to the drive element coupler at a drive position along the drive arm, the drive position being spaced apart from the drive arm axis by a second distance, wherein the first and second distances are substantially the same;

a drive arm driver drivingly coupled to the drive arm at a position between the radially inward portion and the drive position for movement of the drive arm between the third and fourth orientations;

wherein the driver is configured such that movement of the drive arm between the third and fourth orientations substantially mimics movement of the drive element between the first and second orientations; and the drive frame being constructed so that the drive element coupler can pass beneath a portion of the drive frame as the drive arm pivots between the third and fourth orientations.

14. The assembly according to claim 13 further comprising first and second of the drive element couplers extending in substantially opposite directions from the outer portion of the drive arm, whereby the assembly can be used between adjacent solar assemblies in a row of solar collector assemblies.

15. The assembly according to claim 1 wherein the first portion of the drive arm is disposed radially inward relative to the drive arm axis and the second portion is disposed radially outward relative to the drive arm axis.

* * * * *